US011252981B1

(12) United States Patent
Meyer et al.

(10) Patent No.: US 11,252,981 B1
(45) Date of Patent: Feb. 22, 2022

(54) RAW, FROZEN GROUND BEEF (AND/OR OTHER MEAT), METHOD FOR MAKING SAME, AND PACKAGING FOR DISPLAYING SAME

(71) Applicant: Swift Beef Company, Greeley, CO (US)

(72) Inventors: Heidi A. Meyer, Madison, WI (US); Jeffrey C. Meyer, Madison, WI (US); Wayne Bucholtz, West Allis, WI (US); Barbara Schuster, Middleton, WI (US)

(73) Assignee: Swift Beef Company, Greeley, CO (US)

( * ) Notice: Subject to any disclaimer, the term of this patent is extended or adjusted under 35 U.S.C. 154(b) by 51 days.

(21) Appl. No.: 16/169,336

(22) Filed: Oct. 24, 2018

Related U.S. Application Data

(60) Provisional application No. 62/671,116, filed on May 14, 2018, provisional application No. 62/671,133, (Continued)

(51) Int. Cl.
*A23L 13/60* (2016.01)
*A23L 13/50* (2016.01)
(Continued)

(52) U.S. Cl.
CPC .............. *A23L 13/60* (2016.08); *A23B 4/064* (2013.01); *A23L 13/52* (2016.08);
(Continued)

(58) Field of Classification Search
CPC .......... A23L 13/60; A23L 13/52; A23L 17/70; A23L 3/365; A23B 4/064
See application file for complete search history.

(56) References Cited

U.S. PATENT DOCUMENTS 1,773,079 A     8/1930   Clarence
2,302,169 A  *  11/1942  Baker ..................... A23L 3/361
                                                           62/374
(Continued)

FOREIGN PATENT DOCUMENTS

JP    H02177852 A    7/1990
JP    H11253136 A    9/1999
WO    2014070658     5/2014

OTHER PUBLICATIONS

Campus, Marco, "High Pressure Processing of Meat, Meat Products and Seafood," Food Engineering Reviews (Dec. 2010) 2(4):256-273. http://link.springer.com/article/10.1007/s12393-010-9028-y.

(Continued)

*Primary Examiner* — Katherine D Leblanc
(74) *Attorney, Agent, or Firm* — Berg Hill Greenleaf Ruscitti LLP

(57) ABSTRACT

A method for processing or manufacturing a meat product is disclosed. Frozen meat is provided into a meat grinder having a grinder plate having a first surface and a second surface defining apertures of different sizes and shapes extending between the first surface and the second surface. The meat is urged through the apertures by a coolant and chopped or broken into frozen pieces by a blade rotating a spaced distance from the second surface of the plate. The frozen pieces are then provided into and conveyed by an auger conveyor as more coolant is provided into the conveyor to further cool the meat pieces. The meat pieces are then sifted to more optimally obtain desired pieces sizes or range of sizes and/or sublimate the coolant.

14 Claims, 14 Drawing Sheets

Related U.S. Application Data filed on May 14, 2018, provisional application No. 62/577,574, filed on Oct. 26, 2017.

(51) Int. Cl.
*A23B 4/06* (2006.01)
*A22C 17/00* (2006.01)
*A23L 3/365* (2006.01)
*A23L 17/00* (2016.01)

(52) U.S. Cl.
CPC .......... *A22C 17/0026* (2013.01); *A23L 3/365* (2013.01); *A23L 17/70* (2016.08); *A23V 2002/00* (2013.01)

(56) References Cited

U.S. PATENT DOCUMENTS

| | | | |
|---|---|---|---|
| 2,798,814 | A | 7/1957 | Rivoche |
| 2,907,662 | A * | 10/1959 | Covey .................. A22C 17/00 426/646 |
| 3,402,568 | A | 9/1968 | Kamin et al. |
| 4,804,551 | A | 2/1989 | Matthews et al. |
| 4,992,287 | A | 2/1991 | Dreano |
| 5,467,612 | A | 11/1995 | Venetucci |
| 6,033,701 | A | 3/2000 | Hirsch |
| 6,207,215 | B1 | 3/2001 | Wilson et al. |
| 6,235,332 | B1 | 5/2001 | Arnason |
| 6,440,484 | B1 | 8/2002 | Tanaka et al. |
| 7,097,038 | B2 | 8/2006 | Kinigakis |
| 8,507,020 | B2 | 8/2013 | Deslauriers et al. |
| 2004/0043118 | A1 | 3/2004 | Ellert et al. |
| 2005/0112245 | A1 | 5/2005 | DelDuca et al. |
| 2006/0099306 | A1 | 5/2006 | Miller |
| 2007/0071878 | A1 | 3/2007 | Huebner et al. |
| 2008/0050507 | A1 | 2/2008 | Jaehnert |
| 2008/0260916 | A1 | 10/2008 | Kortschack |
| 2009/0291174 | A1 | 11/2009 | Lewis |
| 2010/0119665 | A1 | 5/2010 | Painter et al. |
| 2010/0119678 | A1 | 5/2010 | Sammel et al. |
| 2011/0059217 | A1 | 3/2011 | Meyer |
| 2011/0293817 | A1 | 12/2011 | Hurm et al. |
| 2012/0269952 | A1 | 10/2012 | Parker et al. |
| 2012/0269953 | A1 | 10/2012 | Parker et al. |
| 2013/0059037 | A1 | 3/2013 | Heinz et al. |
| 2013/0183420 | A1 | 7/2013 | Shimek et al. |
| 2013/0209634 | A1 | 8/2013 | Lanzrath et al. |
| 2014/0322396 | A1 | 10/2014 | Walker |

OTHER PUBLICATIONS

Luchansky, J.B. et al., "Fate of Shiga Toxin; Producing O157:H7 and Non-O157:H7 *Escherichia coli* Cells within Refrigerated, Frozen, or Frozen then Thawed Ground Beef Patties Cooked on a Commercial Open-Flame Gas or a Clamshell Electric Grill," Journal of Food Protection (Sep. 2013) 76(9):1500-1512. http://openagricola.nal.usda.gov/Record/IND44728791.

Screen shots of third party products found on the Internet, including "Chatel Farms Ground Beef Individually Frozen," "ASDA Prime Cuts Lean Beef Mince," and "The Butcher's Market Beef Steak Mince Typically under 12% Fat 900g", 2 pgs.

International Search Report and Written Opinion of the International Searching Authority dated Jan. 29, 2019, for International Application No. PCT/US2018/057335 filed Oct. 24, 2018, 8 pages.

* cited by examiner

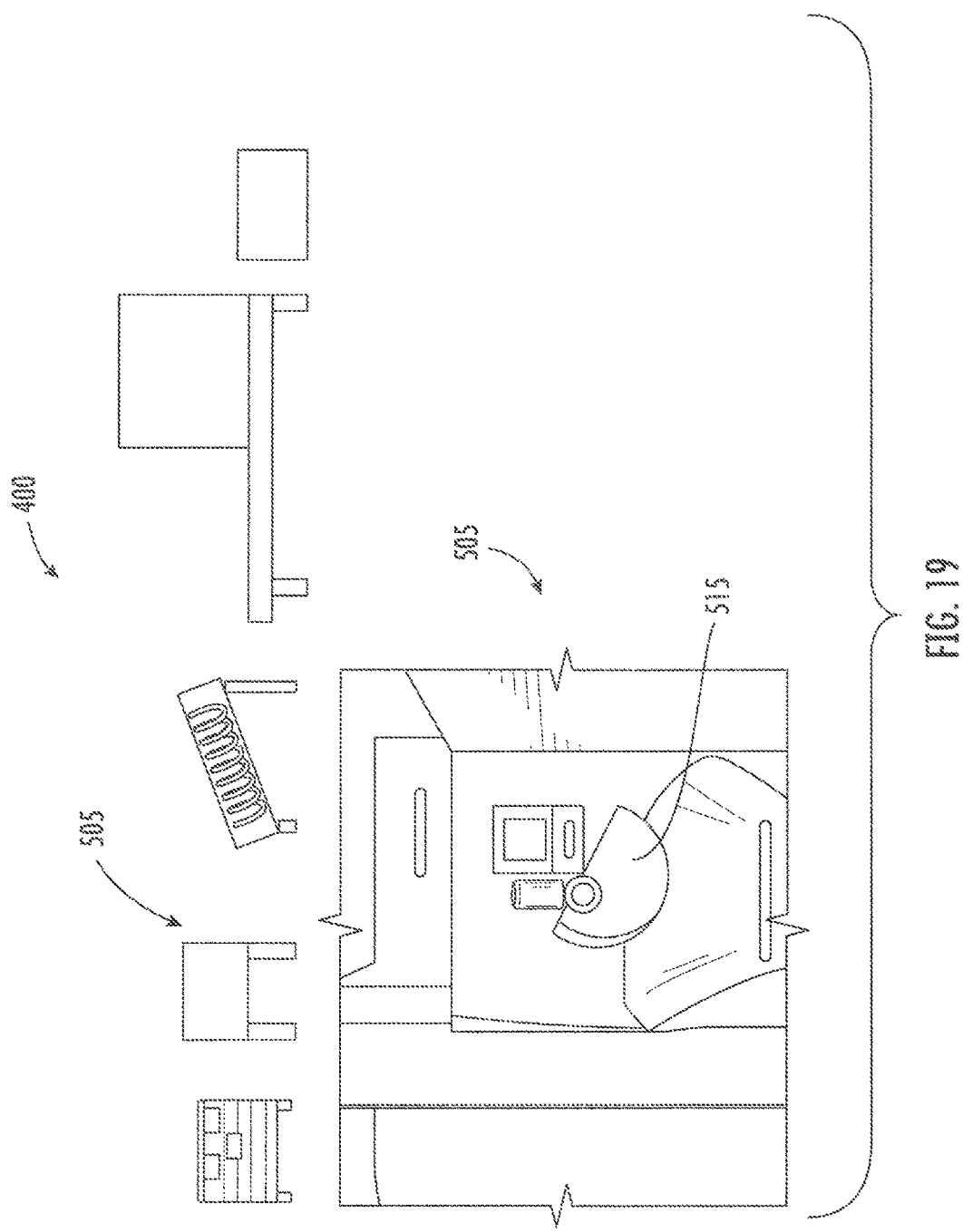

RAW, FROZEN GROUND BEEF (AND/OR OTHER MEAT), METHOD FOR MAKING SAME, AND PACKAGING FOR DISPLAYING SAME

CROSS REFERENCE TO RELATED APPLICATIONS

The application claims benefit of U.S. Provisional Patent Application Serial Nos. 62/577,574, filed Oct. 26, 2017; 62/671,116, filed May 14, 2018; and 62/671,133, filed May 14, 2018; each of which is herein incorporated by reference in its entirety.

BACKGROUND

The processing of ground meat is well known. Ground meat is typically processed by blending different ratios of lean meat and fat together into a meat blend. The meat blend is then ground, comminuted, or reduced in size, and extruded using meat extrusion devices. However, known methods of ground meat production produce a finished product that is not as desirable as it could be to consumers.

For example, ground meat in grocery stores is typically sold refrigerated. However, the majority of refrigerated ground meat is later frozen by consumers for inventory. Additionally, when purchasing larger quantities (such as at club stores or when on sale), consumers often portion or repack ground meat before freezing into one-pound portions into bags or plastic wrap. Portioning and repacking the meat is laborious, messy and exposes the meat to pathogens and the like. Whether repacked at home or left in known trays, the resultant frozen "brick" of ground meat is time-consuming and difficult to thaw and cook. Time may be spent thawing the product on a counter or in a microwave, or the consumer may attempt to thaw and cook the entire brick in a pan, resulting in unevenly cooked edges, raw centers and continuous efforts to chip, portion or otherwise piece the meat into manageable sizes. The thaw step is especially challenging and time consuming, given that most ground meat masses are one to two inches thick.

In addition, when a consumer purchases ground meat and goes to cook that meat, they typically have to take that meat out of the package and handle it in order to prepare it. If the meat is intended to be cooked in a skillet, e.g., for tacos, sloppy joes, or any other meal where the meat is cooked to a pieced state, the user must typically handle and break up the meat from its original compacted state. The unfortunate result is that consumers have to deal with physically handling meat, portioning it to desired amounts, and potentially making a mess.

In an effort to provide a meat product without such drawbacks and challenges, some manufacturers, such as Jimmy Dean Foods, are known to have offered precooked (not raw), frozen, pieced sausage, soy or beef products. However, these products had limited consumer use because they were precooked. In addition, the product was sold in opaque pouches that did not allow for visual inspection by consumers. Such pouches were confusing for consumers as such packaging conceals whether the product inside is cooked or raw.

In other efforts to provide an alternative meat product, a flash frozen meat product was distributed for some time under the Chatel Farms brand. However, the Chatel Farms brand product had a long, uniform noodle or strand shape that was inferior-looking for consumer acceptability. In product optimization research, consumers found the Chatel Farms brand strand unappealing to look at and eat, as it was too uniform and manufactured-looking. The manufacturing process also gave the meat product a pinkish gray color, rather than the red or pink coloration consumers identify with a product that is uncooked and fresh. Additionally, the product was marketed as not needing browning, an important step for consumer acceptability and pathogen kill. The product was also sold in an opaque pouch with no ability to view or inspect the meat for understanding, acceptability or spoilage.

A product similar to the Chatel Farms brand product has been found in Europe. But, the product has the look of "erasers" or tubes of meat that are unappealing to view, cook and eat. In addition, the product is also again packaged in a pouch.

Some of the disadvantages and drawbacks of known meat products were noted in U.S. Patent Application Pub. No. US 2007/0071878, in the name of Swift & Company, entitled "The Process for Making Frozen Ground Meat Pieces and Product Made Thereby" ("Swift"). Swift also disclosed other possible or potential processes for a more appealing frozen ground meat product. However, most if not all of the processes disclosed therein do not work or are otherwise unsatisfactory. For example, Swift disclosed freezing the meat after extrusion, and while the meat is blended inside of a known type of blender during processing. However, in actuality, it is extremely difficult to control the process of freezing in the blender as smaller pieces tend to freeze before larger pieces and the process eventually results in a frozen paste of meat. In addition, Swift disclosed passing the meat through a typical grinder at a temperature of about 25 deg F. to about 40 deg F. As it turns out, however, typical grinders are not designed to work well at these low temperatures, and they often freeze up or break. At the same time, typical grinding at these temperatures, which can be below freezing, results in undesirable "eraser" or tubular shapes that are longer than they are wide and tend to look "manufactured" or processed.

In addition, Swift discloses the use of an improved extruder design having holes of various sizes and configurations and paddles spaced apart at different angular intervals to cause the meat to be pushed out to different sizes as it is cut off. However, in practice, this process does not work as the pressure during extrusion causes the meat to spray and splatter rather than keep its shape.

Swift also discloses creating regularly shaped meat product by freezing a large portion of meat and then shattering it. However, in practice, the shattered product remains in undesirable flat shape and appearance, even after cooking.

As evidenced by Swift, there is a need for a finished frozen ground meat product but a number of lacking methods for making such product.

The packaging of ground meat is also well known. The most common form of packaging for uncooked meat in the U.S. (such as ground beef, ground turkey, etc.) is typically a rigid plastic or foam tray, which holds the food or meat product, and is wrapped and/or sealed with a plastic film. The plastic film is typically transparent to allow prospective consumers to see the food in the packaging. When the food and packaging is displayed in a typical refrigerated merchandiser (e.g., a meat and deli merchandiser or bunker), the packaging is displayed tray down with the plastic film facing up so prospective consumers can see through the plastic film and view the product in the packaging.

However, such packaging does not work well for displaying the food and packaging in a frozen merchandiser such as an upright or vertical display, a freezer display ease with or without doors, or a freezer merchandising case. For example, freezers typically have horizontal shelving and, because typical meat trays are not designed to stand on an edge or side, typical meat packaging is provided on the shelving in a stacked configuration with the plastic film side up similar to how it is provided in a typical bunker merchandiser. Such stacking can make it difficult for consumers to see labels or information on the plastic film, or the food inside the packaging, without physically removing the packaging from the frozen merchandiser.

To make it easier for consumers to view the food product in such merchandisers, some retailers will use spring-loaded pusher trays. Such pusher trays help keep food packaging standing on its edge or side to position the packaging to make it easier for consumers to view the packaged product without removing it from the freezer case. However, such pusher trays are typically an unwanted expense and hassle (e.g., a stocking and maintenance hassle) for retailers.

SUMMARY

A need exists for a finished frozen, raw/uncooked meat product, a method for processing or manufacturing this meat product, and packaging for this product, that offers the following advantages, and/or combination of advantages:

- Easier, faster, and/or better processing method that helps create piece separation to improve cooking ability from a frozen state;
- Easier, faster, and better method for processing in that the frozen meat product is produced in such a way that provides a more desirable, unique, irregular shape to increase consumer acceptability;
- Unique and novel grinder plate shapes that help create more random, more natural product appearance and also help control distribution or range of meat these sizes;
- A process that injects modified-atmosphere gases or coolants such as carbon dioxide ($CO_2$) at the throat of the grinder to help separate meat fragments and force them out of the grinder;
- A process that uses a unique blade external to or outside the grinder plate to help separate the meat pieces, fragments or pieces and help create random appearance and distribution in range of sizes of meat products;
- A process that includes conveying the product using an auger and injection of a modified-atmosphere gas coolant such as $CO_2$ to help create random and more appealing appearance and help ensure frozen pieces;
- Improved ease of storage—product is packaged in a freezer-ready package, not in make-shift or lumpy pouches or bags, similar in general appearance to typical tray execution already known to the consumer;
- Improved ease of use—simply pour frozen pieces, fragments or pieced meat into a pan to cook, no prep or planning required;
- Elimination of a separate thaw step prior to consumer use, which means less or no need to handle or manipulate meat and which reduces the introduction of contaminants and/or the risk of having raw meat contaminate other food or food preparation surfaces;
- Smaller piece size allows for meat to cook relatively quickly and evenly without requiring a separate thaw step;
- Irregular shape and size that leads to a cooked product that is consistent with how raw meat typically looks after cooking;
- Tray that consumers may reuse as a receptacle for the drained ground beef fat/liquid;
- A carton for receiving a meat tray that will help the meat tray stand up vertically on its side on a shelf, without the need for pusher trays;
- A carton for receiving a meat tray which readily displays or communicates information about the product and/or product contents, whether the tray is displayed side down or tray down with the plastic film facing up;
- A carton for receiving a meat tray which allows for viewing of the packaged product even while in the carton;
- A carton for receiving a meat tray including a paperboard format which provides room for improved quality printing (compared to, e.g., using only printed film on a tray) for communicating required and desirable information to consumer;
- A carton for receiving a meat tray which helps a package display nicely regardless of where/how retailers choose to Shelve the product; and
- Use of modified-atmosphere gases beyond just inert nitrogen gases to maintain color consistent with typical uncooked meat and improve attractiveness and appeal to consumers at time of purchase.

It is thus one aspect of the present disclosure to provide a method or process of producing frozen ground meat in a fragmented, pieced, and/or crumbled form. The ground meat pieces are provided in a form that consumers prefer when they are purchasing and/or preparing the meat. The methods of processing or manufacturing give the product a more desirable shape and help keep the product free-flowing. The product more readily cooks directly from a frozen state because of its smaller and irregular size and increased surface area relative to known frozen meat products. It is another aspect of the present disclosure to provide a unique combination of form and package of frozen raw meat for further preparation. The disclosed product form and package provides, among other things, the benefit of reducing or eliminating any requirement to separately thaw the product before consumer cooking or use. The product is packaged in a sealed, modified-atmosphere tray such that it maintains an appearance and color consistent with typical uncooked meat. The product is further packaged in a carton with a window that displays and merchandises the product in-store to consumers, whether laying down or standing up on a side. In addition, the tray may be used to help contain fat and other cooked meat liquid commonly produced during cooking of meat products.

It is thus one aspect of the present disclosure to provide a method for processing meat, the method comprising: providing frozen meat into a meat grinder having a grinder plate having a first surface and a second surface defining apertures of different sizes extending between the first surface and the second surface; urging the meat toward and into the aperture of the grinder plate; and directing a first coolant toward the meat near and in the grinder plate apertures to help urge meat through grinder plate apertures and further cool the meat near and in grinder plate apertures.

It is thus another aspect of the present disclosure to provide a meat product made by a process comprising the steps of: providing frozen meat into a meat grinder having a grinder plate having a first surface and a second surface defining apertures of different sizes extending between the first surface and the second surface; urging the meat toward and into the aperture of the grinder plate; and directing a first coolant toward the meat near and in the grinder plate apertures to help urge meat through grinder plate apertures and further cool the meat near and in grinder plate apertures.

BRIEF DESCRIPTION OF THE DRAWINGS

Various examples of embodiments of the systems, devices, and methods according to this invention will be described in detail, with reference to the following figures, wherein:

FIG. 19 illustrates various components of a raw, frozen ground meat manufacturing system, according to various examples of embodiments;

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
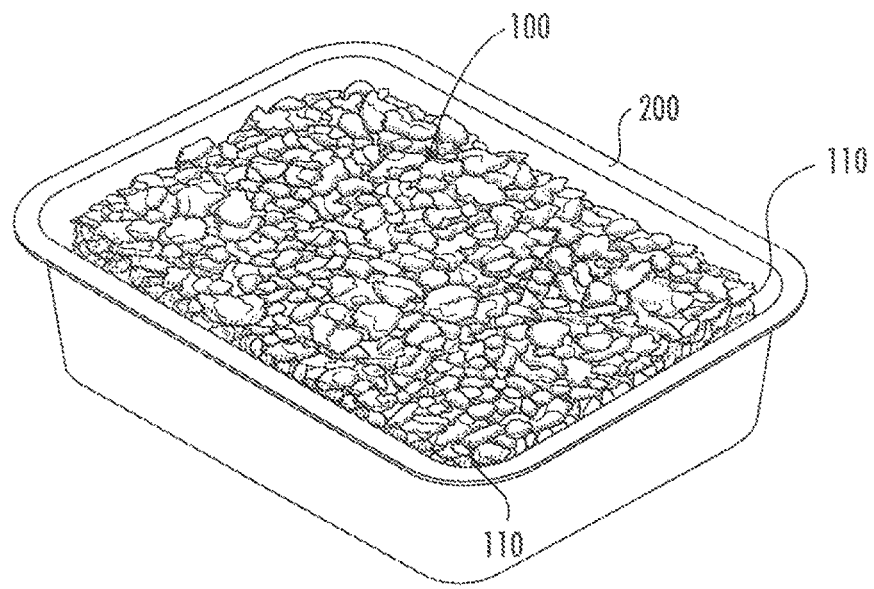
FIG. 1 illustrates a perspective view of a tray of raw, frozen ground meat, according to various examples of embodiments.
Figure 2:
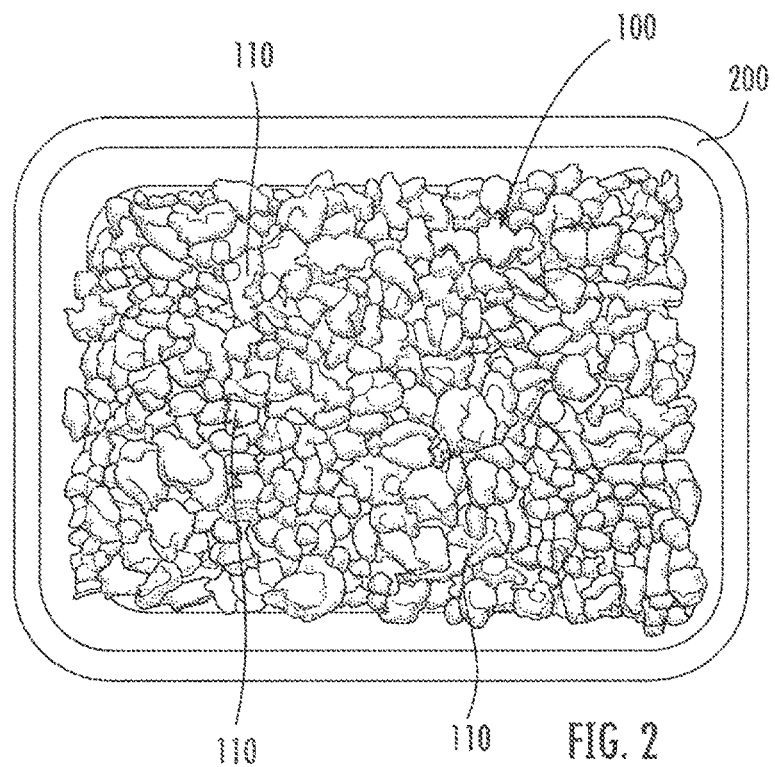
FIG. 2 illustrates a top view of FIG. 1.

Referring to FIGS. 1-2, examples of a raw frozen ground meat product 100 in packaging or a packaging component (e.g., a tray 200) are illustrated. In various embodiments, the raw materials for the disclosed meat product and process include ground beef, pork, poultry, turkey, veal, lamb, and/or chicken meat and/or a blend or combination of meats. Each meat species may have specific USDA standards of identity. For example, these raw materials may have specific USDA standards of identity such as Ground Beef Ground Beef Chuck and Ground Beef Round, where the product can only contain material from skeletal muscle and fatty tissue that is ground to specific sizes and does not contain any other non-meat ingredients and, in the case of beef, has a maximum percent fat content of thirty percent. While "meat," as defined herein, is understood to include any one of beef, poultry, pork, lamb, fish, or the like, "meat" can also generally include non-meat items such as vegetables, starch components, tofu, and/or soy-based products, in combination with animal-derived portions.

In various embodiments, meat product 100 is typical of ground beef (or other ground meat) in that it has a lean content of seventy-three percent to ninety-three percent but is more preferably eighty percent to ninety percent lean. In the case of ground beef, in various embodiments, product 100 is one hundred percent pure beef, containing no additives, no preservatives and no artificial colors, and is made of typical or grass-fed beef and is all natural.

In various embodiments, product 100 is provided in fragmented, pieced, and/or crumbled form 110. In various embodiments, the sizes of pieces 110 are relatively small and varied. In various embodiments, pieces 110 have an irregular diameter ranging from between ³⁄₁₆" and ⁵⁄₁₆" which helps pieces 110 to concurrently and/or contemporaneously thaw and cook relatively evenly. While some clumping and size and shape variation and other irregularity may occur, in various embodiments, the irregular diameter of most pieces 110 (e.g., in a tray 200) does not exceed ½".

The term diameter is used to describe the relative size of an individual meat piece or fragment 110 and, in various embodiments, meat pieces or fragments 110 typically have an irregular diameter (and are not perfectly round). Typically meat pieces of irregular size and shape are desired. Therefore, the use of the term "irregular diameter" is used herein to define the relative size of the meat pieces. Also, "irregular diameter" describes a meat piece that does not necessarily have a circular disposition. Preferably, the meat pieces have characteristics similar to those of crumbled, browned meat a consumer would prepare in a browning skillet or similar cooking apparatus. However, certain circumstances may exist where a more uniformly shaped meat piece is desired rather than the traditional non-uniform pieces, and "irregular diameter" can also describe a substantially spherical or round meat piece.

In various examples of embodiments, pieces 110 are generally irregularly shaped, and not uniform or spherical in appearance. In various embodiments, pieces 110 generally have a pink or red coloration when frozen and packaged.

In various embodiments, most pieces or fragments 110 by weight (e.g., in a package or tray 200) are irregularly shaped and range from about 3/16" to 1/2" in irregular diameter. In various embodiments, most pieces or fragments 110 by weight (e.g., in a package or tray 200) are irregularly shaped and range from about 3/16" to 3/8" in irregular diameter, in various embodiments, most pieces or fragments 110 by weight (e.g., in a package or tray 200) are irregularly shaped and range from about 3/16" to 5/16" in irregular diameter. In various embodiments, most pieces or fragments 110 by weight (e.g., in a package or tray 200) are irregularly shaped and range from about 5/16" to 3/8" in irregular diameter, in various embodiments, most pieces or fragments 110 by weight (e.g., in a package or tray 200) are irregularly shaped and range from about 5/16" to 1/2" in irregular diameter.

In various embodiments, pieces or fragments 110 (e.g., in a package or tray 200) have a maximum irregular diameter dimension of 1/2". In various embodiments, most pieces or fragments 110 by weight (e.g., in a package or tray 200) have a maximum irregular diameter dimension of 1/2". In various embodiments, pieces or fragments 110 (e.g., in a package or tray 200) have a maximum irregular diameter dimension of 3/8". In various embodiments, most pieces or fragments 110 by weight (e.g., in a package or tray 200) have a maximum irregular diameter dimension of 3/8". In various embodiments, pieces or fragments 110 (e.g., in a package or tray 2001 have a minimum irregular diameter dimension of about 11/64". In various embodiments, most pieces or fragments 110 by weight (e.g., in a package or tray 200) have a minimum irregular diameter dimension of 11/64".

In various embodiments, the majority of pieces 110 by weight (e.g., in a package or tray 200) are individual pieces, rather than provided in clusters. However, meat product 100 may include clustered pieces or clusters. In various embodiments, less than twenty-five percent of meat product 100 by weight (e.g., in a package or tray 200) is clustered or in clusters. In various embodiments, meat product 100 (e.g., in a package or tray 200) includes no clusters greater than 1" in irregular diameter. In various embodiments, less than twenty-five percent of meat product 100 by weight (e.g., in a package or tray 200) is in clusters greater than 1" in irregular diameter.

In various examples of embodiments, meat product 100 includes pieces or fragments having a variety of irregular diameters. For example, in various embodiments, product 100 by weight (e.g., in packaging or tray 200) includes one percent to fifteen percent pieces or fragments 110 having a maximum irregular diameter less than 3/16". In various embodiments, product 100 by weight (e.g., in packaging or tray 200) includes twenty percent to thirty-five percent pieces or fragments 110 having a maximum irregular diameter from 3/16" to less than 5/16". In various embodiments, product 100 by weight (e.g., in packaging or tray 200) includes twenty-five percent to forty percent pieces or fragments 110 having a maximum irregular diameter from 5/16" to less than 3/8". In various embodiments, product 100 by weight (e.g., in packaging or tray 200) includes ten percent to twenty-five percent pieces or fragments 110 having a maximum irregular diameter from 3/8" to less than 1/2". In various embodiments, product 100 by weight (e.g., in packaging or tray 200) includes ten percent to twenty percent pieces or fragments 110 having a maximum irregular diameter of about 1/2".

As another example, in various embodiments, product 100 by weight (e.g., in packaging or tray 200) includes one percent to seven percent pieces or fragments 110 having a maximum irregular diameter less than 3/16". In various embodiments, product 100 by weight (e.g., in packaging or tray 200) includes twenty-four percent to thirty percent pieces or fragments 110 having a maximum irregular diameter from 3/16" to less than. 5/16". In various embodiments, product 100 by weight (e.g., in packaging or tray 200) includes twenty-eight percent to thirty-four percent pieces or fragments 110 having a maximum irregular diameter from 5/16" to less than 3/8". In various embodiments, product 100 by weight (e.g., in packaging or tray 200) includes thirteen percent to nineteen percent pieces or fragments 110 having a maximum irregular diameter from 3/8" to less than 1/2". In various embodiments, the product by weight (e.g., in packaging or tray 200) includes twelve percent to eighteen percent pieces or fragments 110 having a maximum irregular diameter of about 1/2".

As another example, in various embodiments, product 100 by weight (e.g., in packaging or tray 200) includes about four percent pieces or fragments 110 having a maximum irregular diameter less than 3/16". In various embodiments, product 100 by weight (e.g., in packaging or tray 200) includes about twenty-seven percent pieces or fragments 110 having a maximum irregular diameter from 3/16" to less than 5/16". In various embodiments, product 100 by weight (e.g., in packaging or tray 200) includes about thirty-one percent pieces or fragments 110 having a maximum irregular diameter from 5/16" to less than 3/8". In various embodiments, product 100 by weight (e.g., in packaging or tray 200) includes about sixteen percent pieces or fragments 110 having a maximum irregular diameter from 3/8" to less than 1/2". In various embodiments, product 100 by weight (e.g., in packaging or tray 200) includes about fifteen percent pieces or fragments 110 having a maximum irregular diameter of about 1/2".

In various embodiments, raw materials proximate analysis compositions in this disclosure include chemical lean contents (moisture and fat in the raw material) in the range of seventy percent to ninety-eight percent with it more preferably being eighty percent to ninety percent.

Raw materials formulations containing non-meat ingredients and additives such as salt, spices, and USDA-approved extenders and ingredients may also be used to create specific flavored raw meat pieces such as taco meat pieces, chili meat pieces, Italian meat pieces used for spaghetti, etc.

The product may be seasoned with spices or sauces. Example seasonings include salt and pepper, Italian spice blend (for spaghetti or lasagna, for example), Mexican/taco or chili spice blend, sloppy joe spice blend, spaghetti sauces, sloppy joe sauce, etc. The product may be sold "With . . . " added other food, such as, for example, diced onion, peppers and/or celery.

In various examples of embodiments, the meat pieces are packaged for sale in tray 200. In various embodiments; tray 200 looks similar to that typically used in the sale of refrigerated, raw ground beef. Instead of expanded polystyrene, however, various examples of embodiments of tray 200 are made of a plastic amenable to being stored in an environment below freezing, and which contains an oxygen barrier such as Polypropylene or multi-layered structures. In various embodiments, tray 200 is made of a rigid plastic. It should be appreciated, however, that tray may be made of other types of materials (such as various foams). In various embodiments, the film is a clear plastic film. The disclosed tray allows the consumer or user to drain fat into the tray, thereby reusing it and providing a secondary function. The tray is approximately 8 3/4"×6 1/2"×2" deep but can be other dimensions, including those that yield approximately the same volume.

Figure 3:
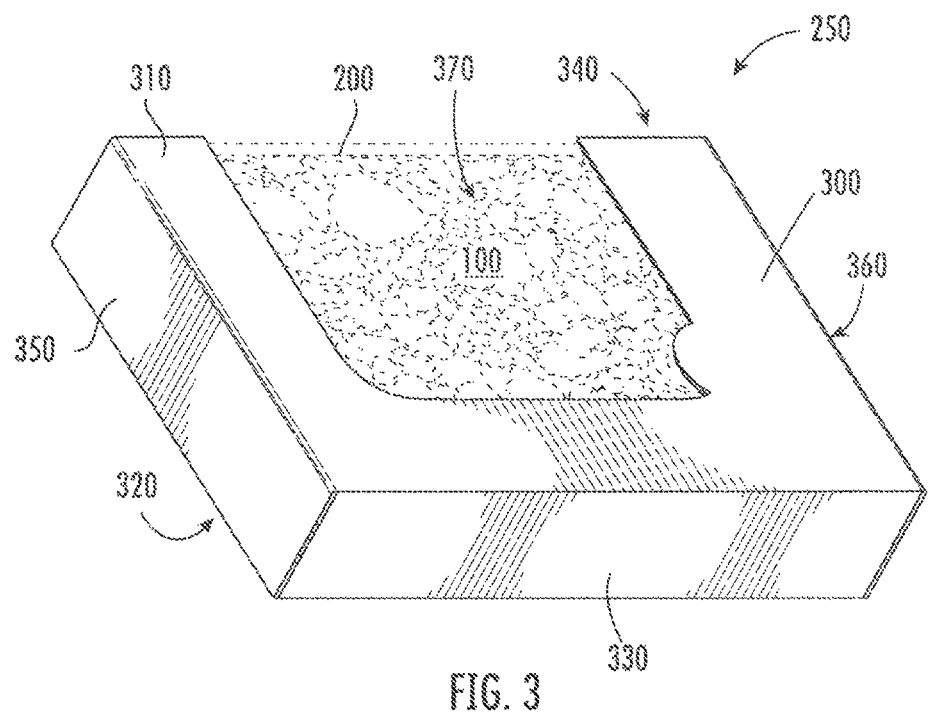
FIG. 3 illustrates a perspective view of a packaged raw, frozen ground meat product, according to various examples of embodiments.
Figure 4:
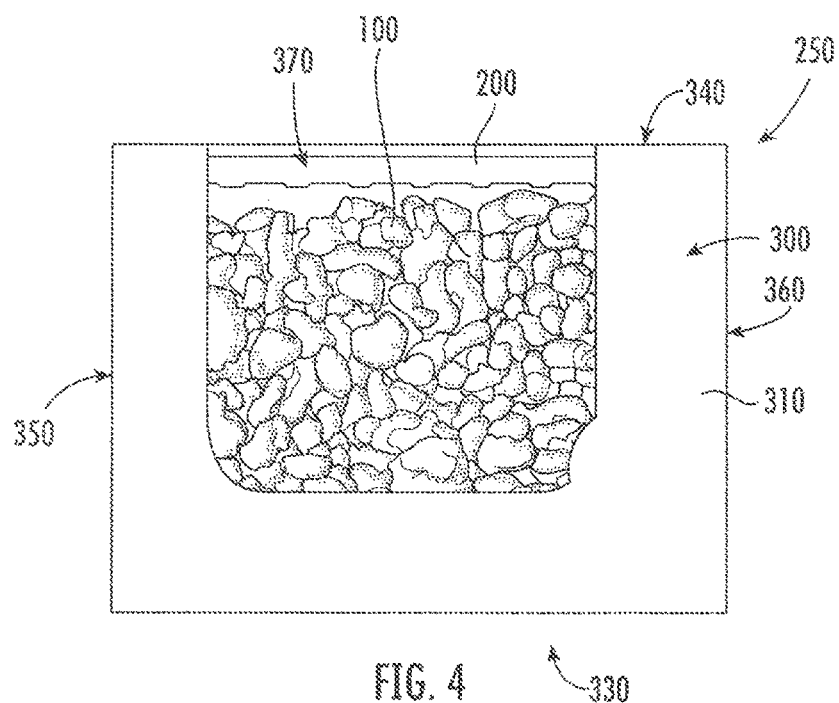
FIG. 4 illustrates a plan view of the packaged product illustrated in FIG. 3.

Referring to FIGS. 3-4, in various examples of embodiments, tray 200 including meat product 100 is merchandised in a packaging system 250 including a display carton 300 adapted to receive tray 200. In various examples of embodiments, display carton 300 includes a front surface 310, an opposing rear surface 320, a bottom surface 330, a top surface 340, and opposing side surfaces 350/360.

In various embodiments, front surface 310 defines a cutout or window 370. In various embodiments, top surface 340 also helps define cutout or window 370. In various embodiments, one or both of the side surfaces also help define the cutout or window.

In various embodiments, cutout or window 370 extends a distance between opposing side surfaces 350/360. In various embodiments, cutout or window 370 extends approximately zero to one hundred percent of the distance between opposing side surfaces 350/360. In various embodiments, cutout or window 370 extends approximately five to one hundred percent of the distance between opposing side surfaces 350/360. For example, in various embodiments, cutout or window 370 extends up to approximately sixty to seventy percent of the distance between opposing side surfaces 350/360.

In various embodiments, cutout or window 370 extends a distance between the top surface 340 and bottom surface 330. In various embodiments, cutout or window 370 extends approximately five to one hundred percent of the distance between top surface 340 and bottom surface 330. For example, in various embodiments, cutout or window 370 extends up to approximately seventy to eighty percent of the distance between the top and bottom surfaces 340/330.

In various embodiments, cutout or window 370 extends a distance between the front surface 310 and rear surface 320. In various embodiments, cutout or window 370 extends approximately five percent to one hundred percent of the distance between the front and rear surfaces 310/320, For example, in various embodiments, cutout or window 370 extends up to approximately fifty to one hundred percent of the distance between the top and bottom surfaces 310/320.

In various embodiments, window or cutout 370 allows for visual inspection of product and/or quality (e.g., by the consumer). It should be appreciated, however, that the display carton does not need to define a cutout or window, it should also be appreciated that the window may be defined by other portions of the display carton including the bottom surface, the top surface and/or the opposing side surfaces.

In various embodiments, display carton 300 is made of paper board. In various embodiments, the display carton is made of corrugated board (e.g., a light corrugated board). It should be appreciated that relatively thicker material may help maintain the meat tray and/or packaging system standing on its bottom surface.

In various embodiments, packaging system 250 including tray 200 and carton 300 is self-supporting or self-standing on its bottom surface 330, or its rear surface 320. Display carton 300 may be displayed or otherwise stored (e.g., stacked) on its bottom surface 330 (i.e., in a vertical orientation) and displayed or otherwise stored on its rear surface 320 (i.e., in a horizontal orientation). In various embodiments, carton 300 can be displayed or otherwise stored on rear surface 320, bottom surface 330, or either opposing side surfaces 350/360. In various embodiments, and because of the different display possibilities, front surface 310, rear surface 320, bottom surface 330, top surface 340, and/or at least one opposing side surface 350/360 of carton 300 includes product information for consumers or prospective consumers.

Carton 300 may allow for a visual billboard in-store and may also stack neatly in a freezer display ease and/or a consumer's freezer. Packaging system 250 including display carton 300 and meat tray 200 may be displayed resting on bottom surface 330 of display carton 300, to allow the prospective consumer to view the information available on front surface 310 of partial carton 300 and/or the product itself sealed within the film sealing tray 200 (e.g., while packaging system 250 is displayed in a case (e.g., a freezer case). Packaging system 250 may be displayed on its own or in a horizontally stacked configuration with other packaging systems, without the need for a pusher tray or other support. Packaging system 250 may also be displayed such that at least one of opposing sides 350/360, and/or information thereon are viewable by a prospective consumer when packaging system 250 is displayed in a case (e.g., a freezer case).

A carton may also allow for multiple bags or trays (e.g., multiple one-pound bags for club store sales, multiple unit sales, two eight-ounce packages in one carton, etc.). Other amounts or weights or packaging may also be utilized. For example, multi-pound packaging (e.g., two, three, or five pound) may be utilized for better value and/or club stores, or one half pound internal packaging for recipe flexibility. This could include a gusseted or standup pouch or pouch or pouches in a carton or a master case, such as for foodservice use.

Figure 5:
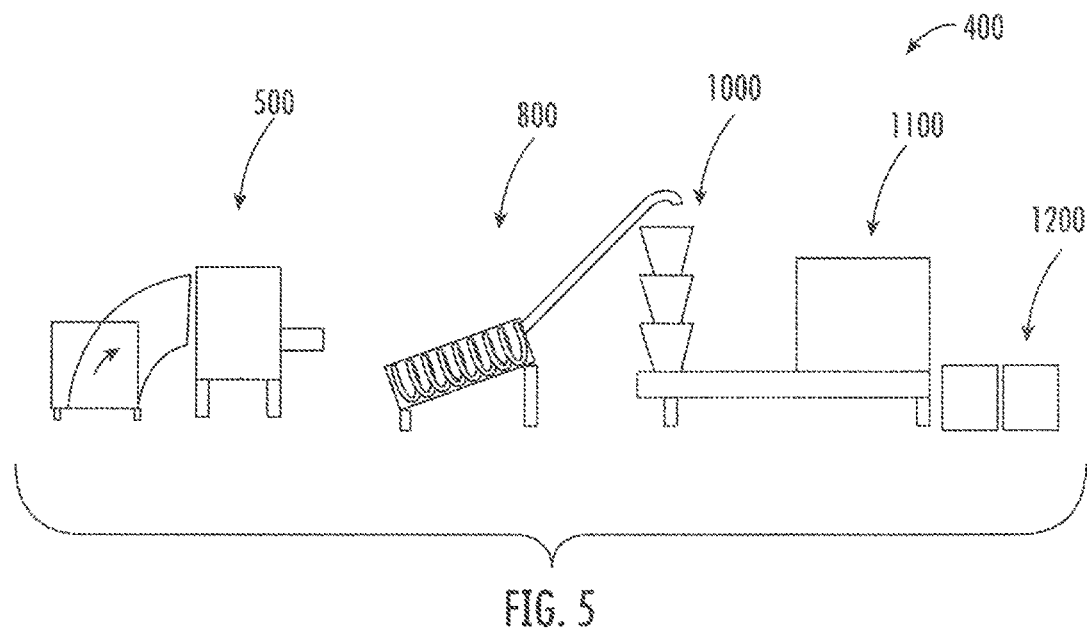
FIG. 5 illustrates various components of a raw, frozen ground meat manufacturing system, according to various examples of embodiments.
Figure 6:
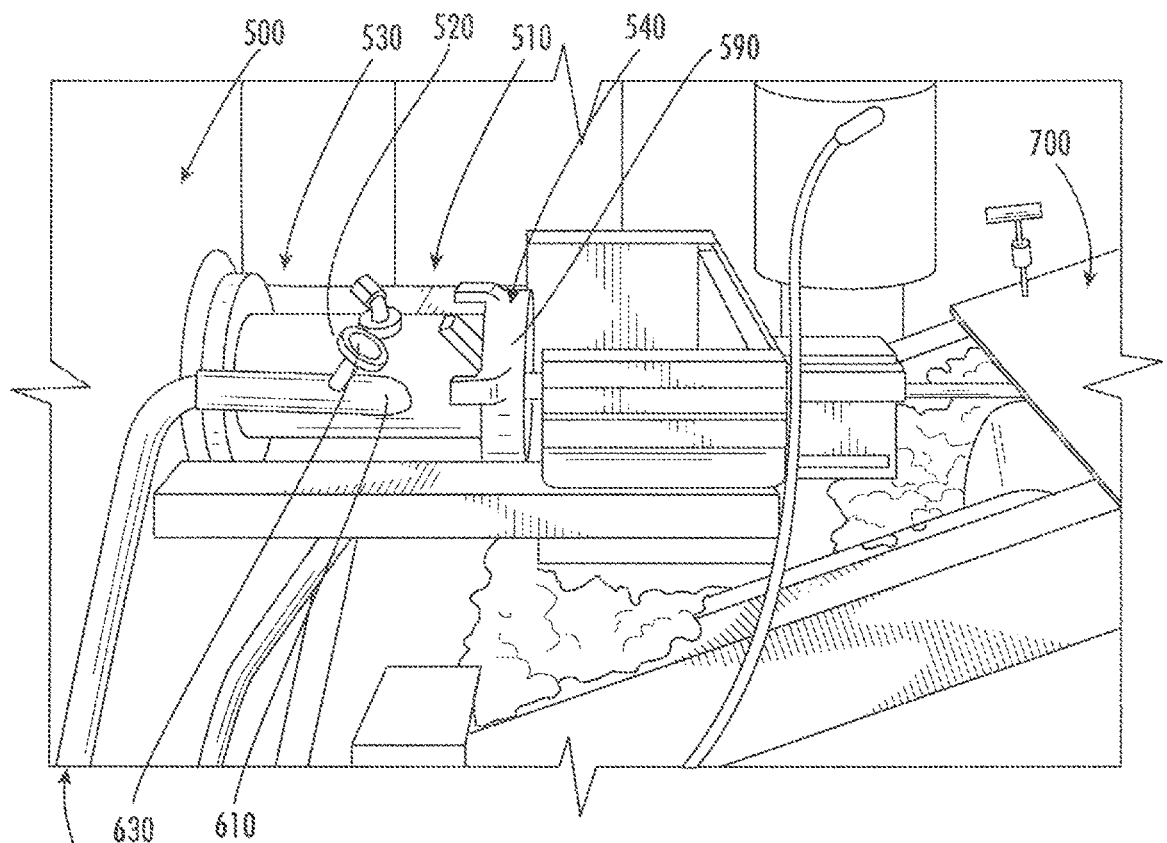
FIG. 6 illustrates a perspective view of a grinder and an auger or conveyor, according to various examples of embodiments.
Figure 7:
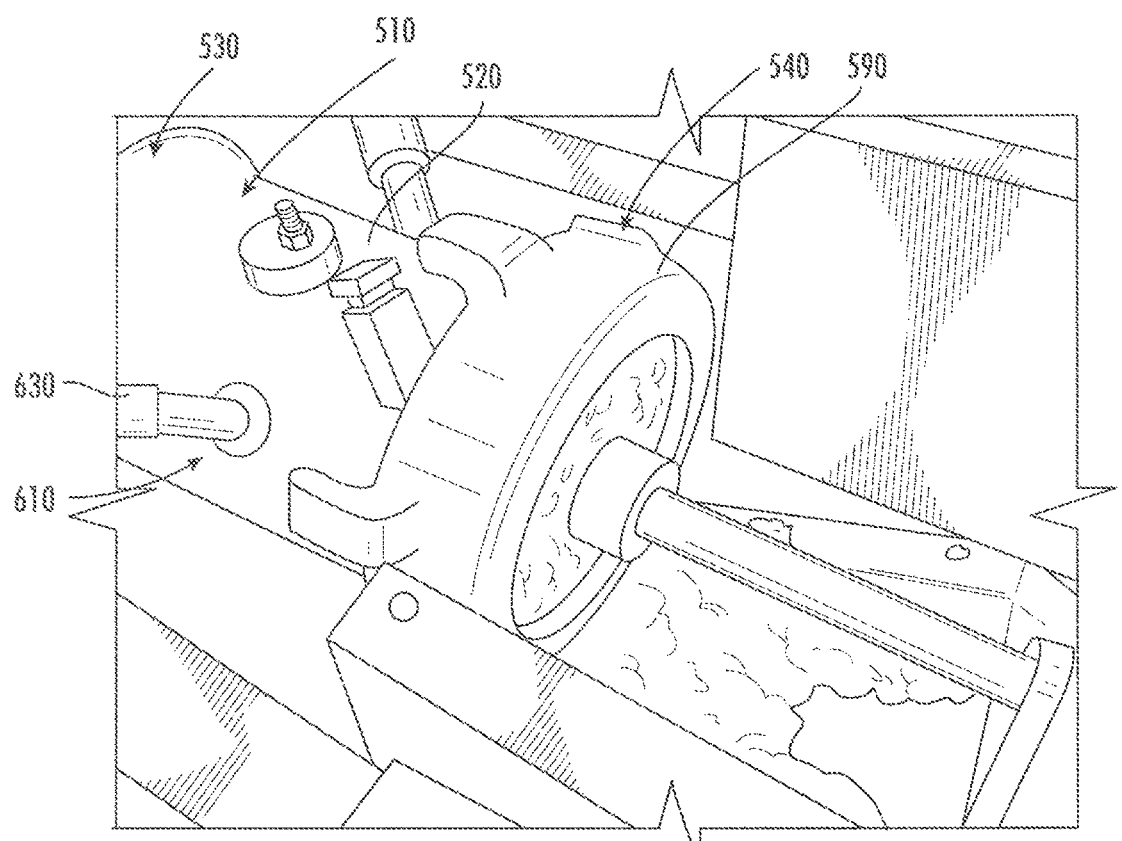
FIG. 7 illustrates a perspective view of the grinder of FIG. 6, and an external or outer blade, according to various examples of embodiments.

Referring now to FIG. 5, an example embodiment of a system, equipment, and process for making the meat product disclosed herein is illustrated. In various embodiments, a meat processing system 400 is provided, processing system 400 including a grinder 500 and a conveyor 800. In various examples of embodiments, the system also includes a sifter (see, e.g., FIG. 23). In various examples of embodiments, system 400 also includes a combination scaler/filler 1000, modified atmosphere and tray packaging equipment 1100, and cartoning and easing equipment 1200.

Referring more specifically to FIGS. 6-10, grinder 500, according to various embodiments, is illustrated. In various examples of embodiments, grinder 500 includes a holding device 510 having a housing 520, housing 520 including a proximal end or portion 530 and a distal end portion 540, and defining a central cavity 550. In various embodiments, and referring more specifically to FIGS. 9 and 10, central cavity 550 houses an auger 560, an internal or inner blade 570, and a grinder plate 580. In various embodiments, housing 520 is provided with external threads which receive internal threads of a retaining ring 590 of holding device 510.

Within central cavity 550 of grinder housing 520 is a typical auger 560 having a helical blade 600 which sweeps along an inner periphery of housing 520 so as to feed meat which is to be ground forwardly toward and/or through grinder plate 580. In various examples of embodiments, grinder plate 580 is urged towards, near or against inner blade 570 by retaining ring 590 when retaining ring 590 is tightened onto housing 520.

In various embodiments, holding device housing 520 defines one or more apertures or inlets 610 near distal portion 540 of housing 520. In various examples of embodiments, apertures or inlets 610 are spaced (e.g., equidistantly) about distal portion 540. In various embodiments, apertures or inlets 610 are fluidly coupled to a source 620 of coolant, such as $CO_2$, $N_2$, argon, compressed air, freon, ammonia, or another known or later-developed coolant. In various embodiments, the coolant is $CO_2$. In various examples of embodiments, the coolant flows through an injection valve 630.

Figure 8:
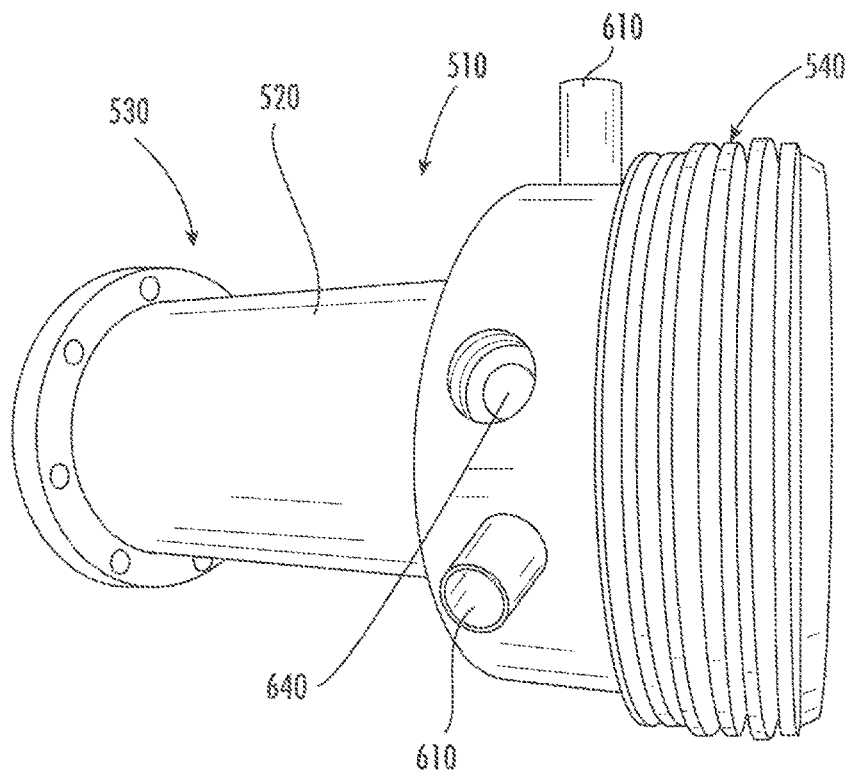
FIG. 8 illustrates a perspective view of a grinder body or housing, according to various examples of embodiments.
Figure 9:
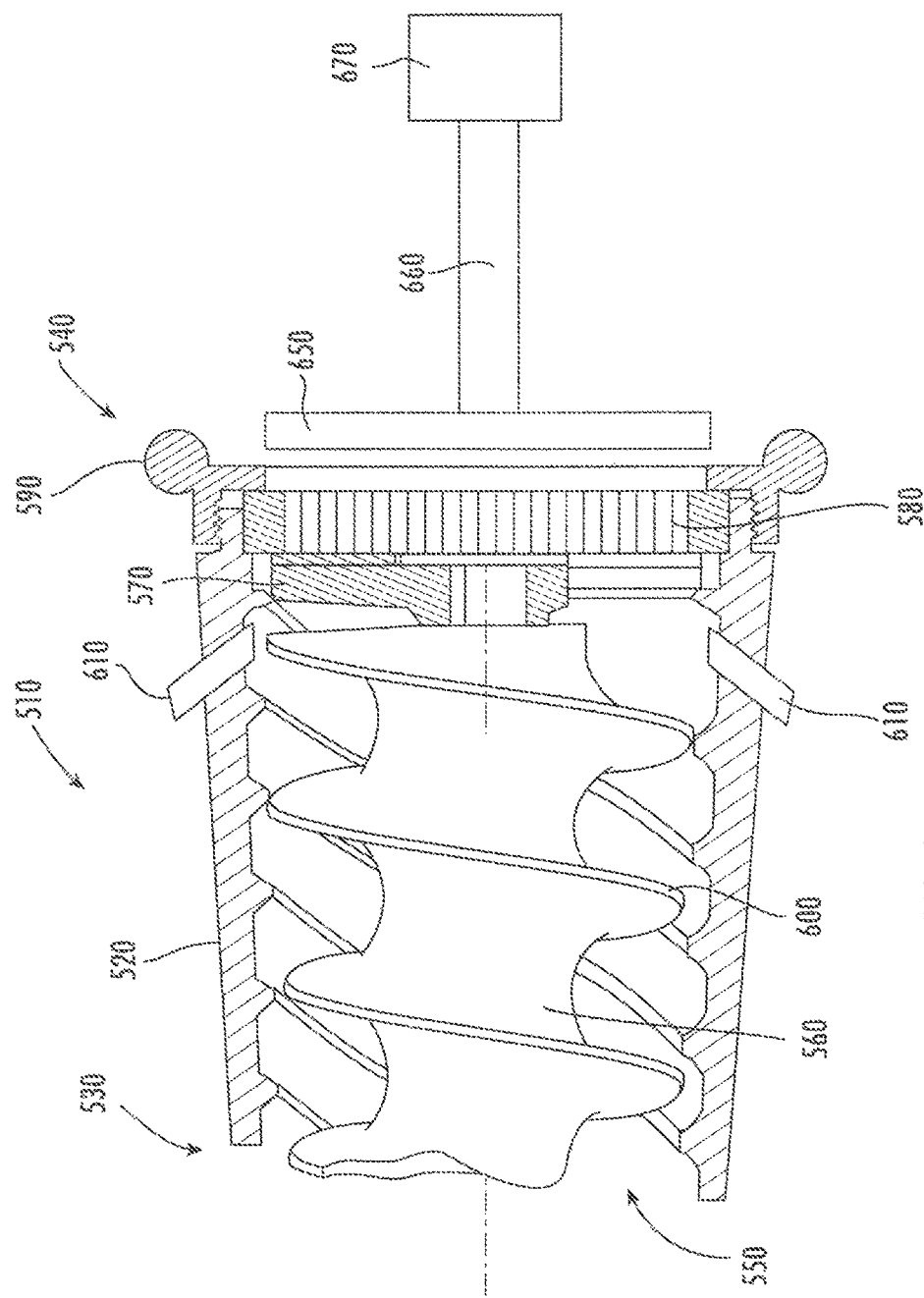
FIG. 9 illustrates a cross-sectional view of a grinder, according to various examples of embodiments.
Figure 10:
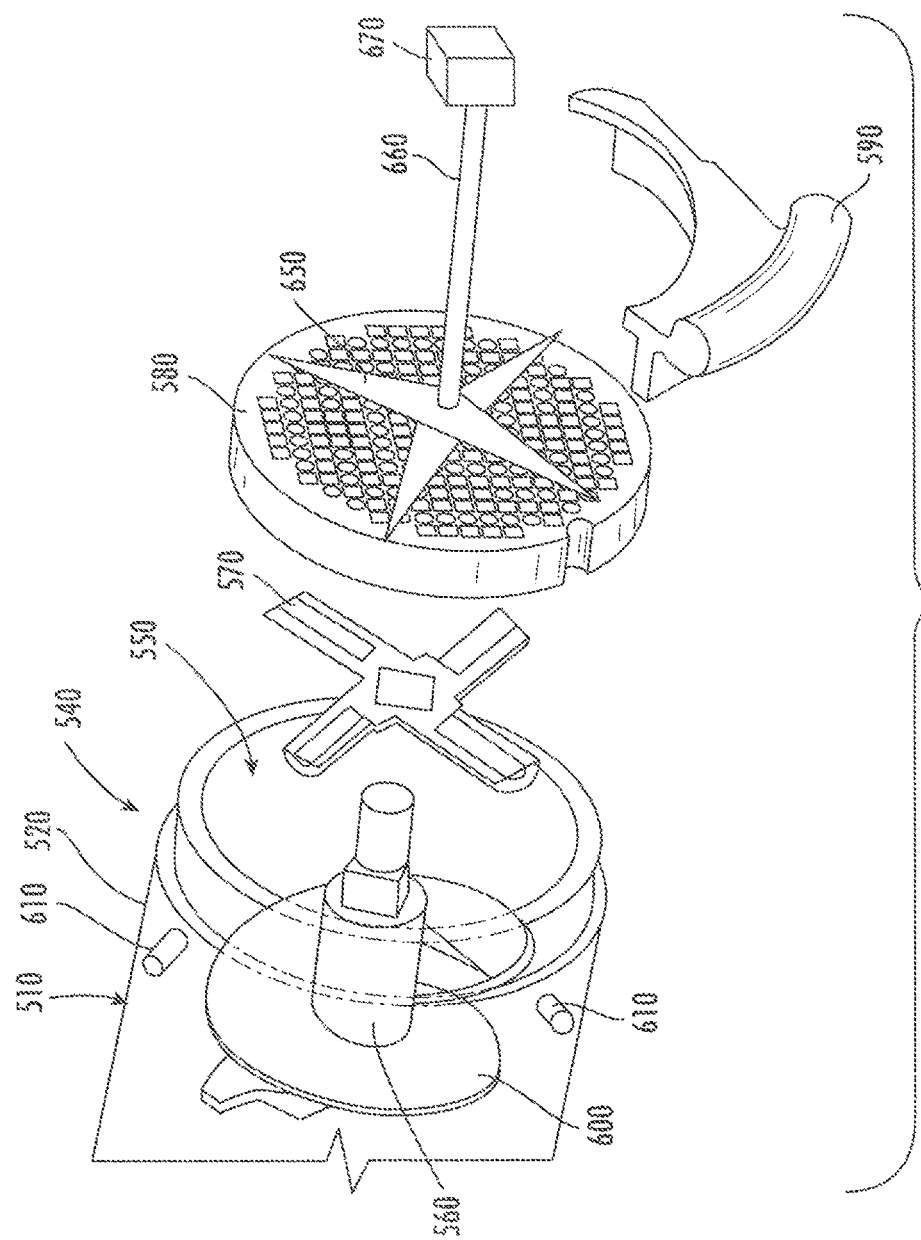
FIG. 10 illustrates a perspective exploded view of various components of a grinder, according to various examples of embodiments.
Figure 11:
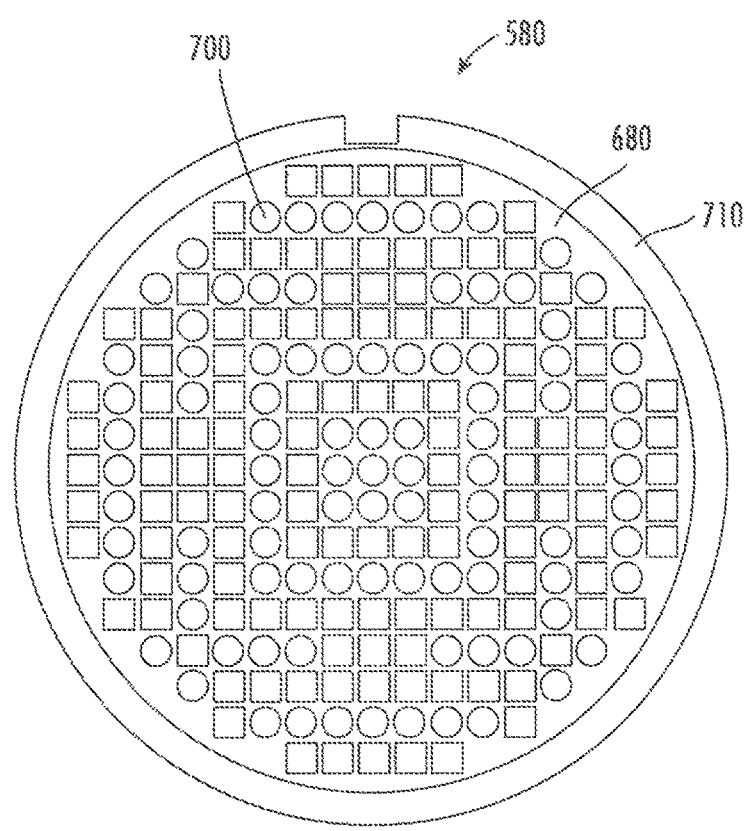
FIG. 11 illustrates a plan view of a grinder plate, according to various examples of embodiments.
Figure 12:
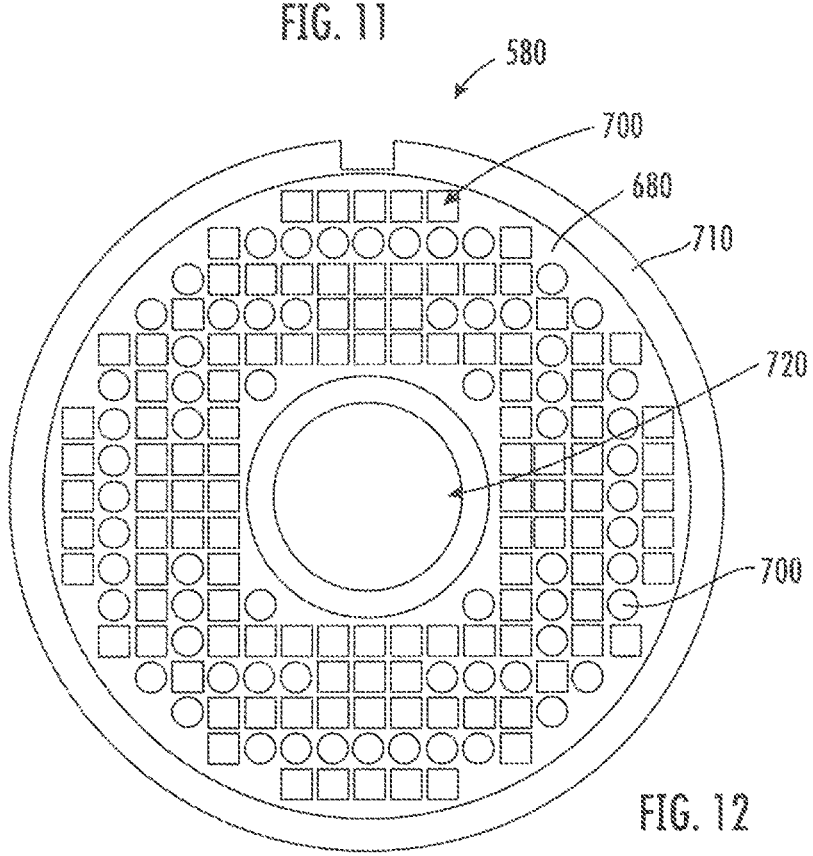
FIG. 12 illustrates a plan view of a grinder plate, according to various examples of embodiments.
Figure 13:
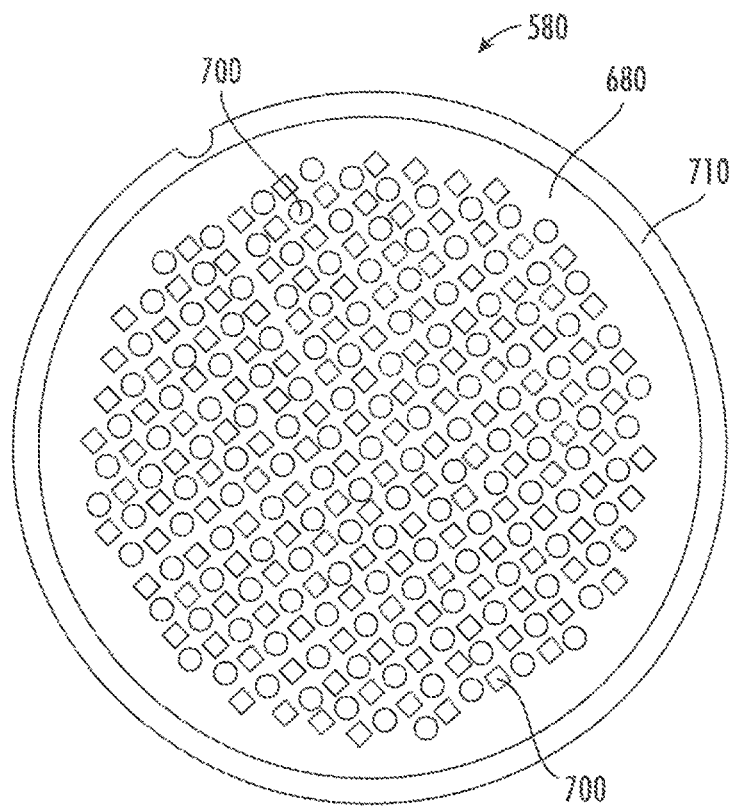
FIG. 13 illustrates a plan view of a grinder plate, according to various examples of embodiments.
Figure 14:
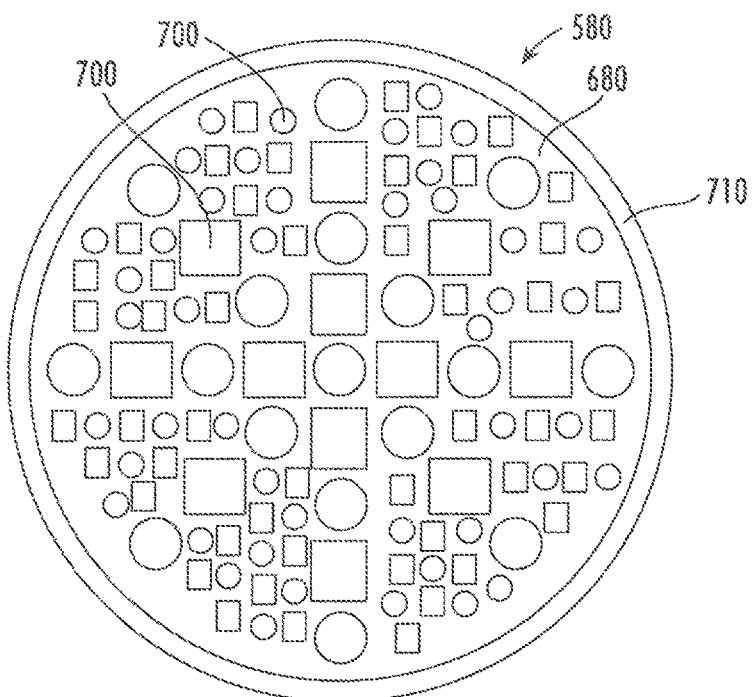
FIG. 14 illustrates a plan view of a grinder plate, according to various examples of embodiments.
Figure 15:
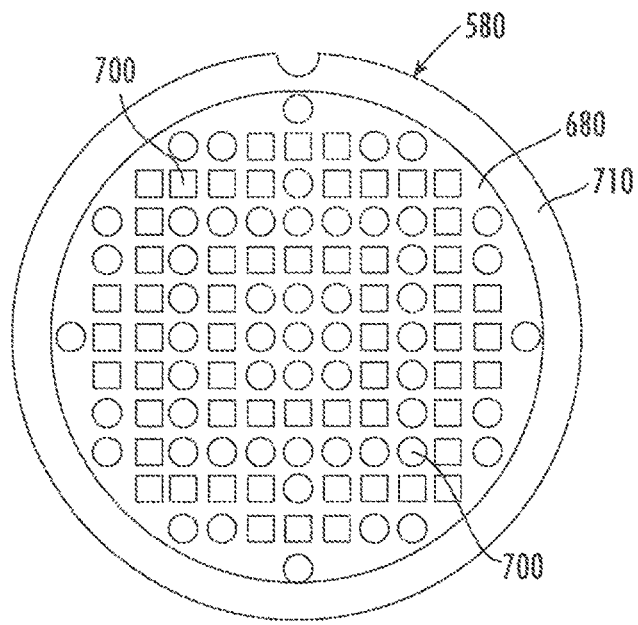
FIG. 15 illustrates a plan view of a grinder plate, according to various examples of embodiments.
Figure 16:
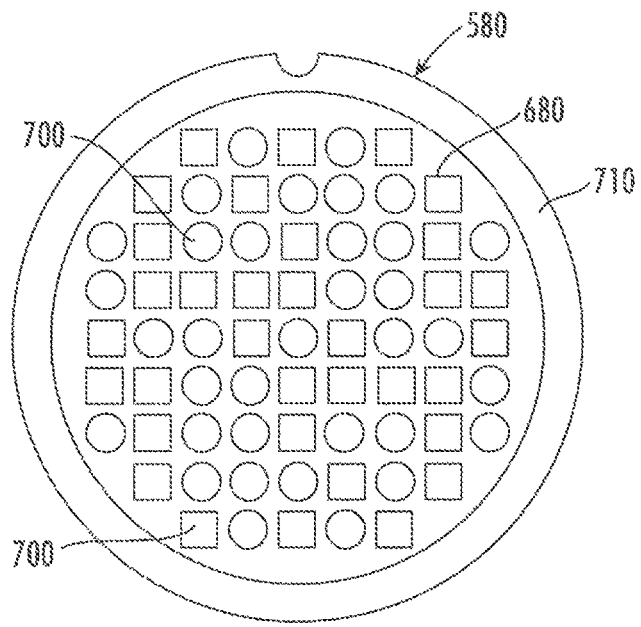
FIG. 16 illustrates a plan view of a grinder plate, according to various examples of embodiments.
Figure 18:
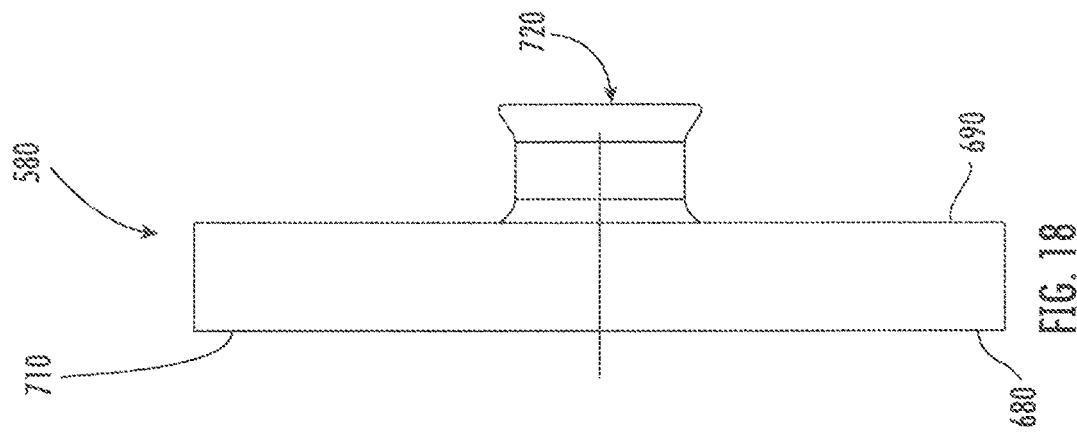
FIG. 18 illustrates a side view of the grinder plate of FIG. 17.
Figure 17:
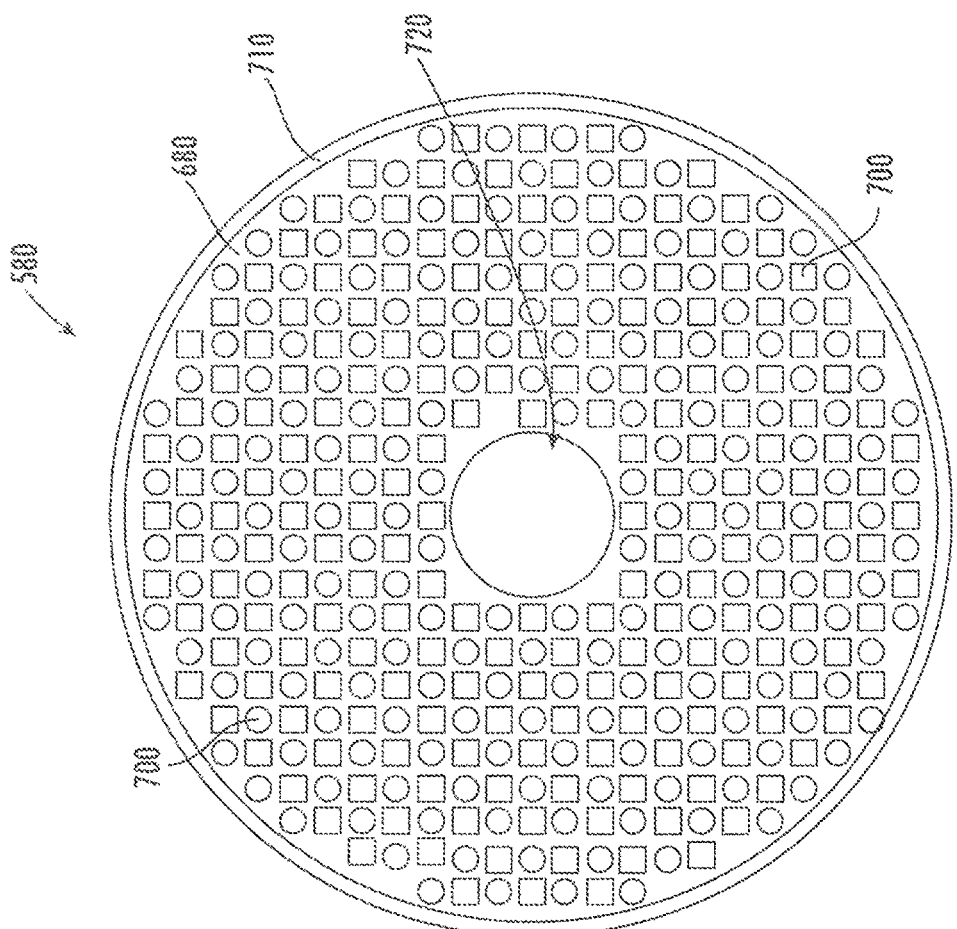
FIG. 17 illustrates a plan view of a grinder plate, according to various examples of embodiments.

As illustrated in FIG. 8, holding device housing 520 may also define a peripheral passageway 640 into which grinder 500 is designed to direct unwanted materials such as bone fragments, sinews and/or gristle.

In various embodiments, and referring again to FIGS. 9-10, at least one external or outer blade 650 placed or provided externally or just after grinder plate 580 to apply a cutting, fracturing and/or breaking action to meat as or after it is passed through grinder plate 580. In various embodiments, blade 650 is operatively coupled and driven by a drive shaft 660 operatively coupled to a motor 670.

In various examples of embodiments, external knife or blade 650 is angled relative to grinder plate 580. In various examples of embodiments, the angle of external knife or blade 650 relative to grinder plate 580 is about 20-30 deg. For example, in various embodiments, the angle of external knife or blade 650 relative to grinder plate 580 is about 25 deg. In various embodiments, external knife or blade 650 is spaced about ¼" to about ½" from grinder plate (i.e., from an outer surface of grinder plate 580). In various embodiments, external knife or blade 650 is spaced about ⅜" from grinder plate 580. It should be appreciated, however, that the spacing between the grinder plate and external knife can be larger or smaller (or even varied during operation) depending upon the desired sizes and ranges of the meat pieces. It should also be appreciated that, while four blades are illustrated in the figure, any number of blades may be included or utilized.

Referring now to FIGS. 11-18, grinder plate 580 is a disk-shaped annular plate having a first or flat inner surface 680 and a second or flat outer surface 690. Grinder plate 580 defines or is provided with a plurality of apertures or holes 700, each hole 700 extending from inner surface 680 to outer surface 690 so as to provide a plurality of small passageways for the meat to pass therethrough. The outer peripheral area 710 of plate 580, however, may be essentially solid so as to form an annular ring, against which the retaining ring may abut. In various embodiments, grinder plate 580 may also define a central passage 720 (see, e.g., FIGS. 12 and 17-18). In various embodiments, central passage 720 is desirable or provided where grinder 500 is designed to direct bone fragments, sinews and gristle inwardly toward passage 720 in plate 580.

In various embodiments, apertures or holes 700 have a variety of inner cross-sectional dimensions. In various embodiments, plate 580 defines multiple cross-sectional sizes of apertures or holes 700. In various embodiments, plate 580 defines at least three relatively differently sized apertures or holes 700. In various embodiments, plate 580 defines at least four differently sized apertures or holes 700. In various embodiments, plate 580 defines at least five differently sized apertures or holes 700. In various embodiments, plate 580 defines at least three different or unequal cross-sectional sizes of apertures or holes 700, each of the different or unequal sizes making up about an equal proportion of the total number of apertures or holes 700.

In various embodiments, the inner diameter or dimension of the smallest apertures 700 is greater than or equal to ¹¹⁄₆₄". In various embodiments, the inner diameter or dimension of the smallest apertures 700 is greater than or equal to ⁵⁄₃₂". For example, and referring to FIGS. 11-12, in various embodiments, grinder plate 580 includes a number of apertures 700 having an inner cross-sectional dimension or diameter of about ¹¹⁄₆₄", a number of apertures 700 having an inner cross-sectional dimension or diameter of about ³⁄₁₆", a number of apertures 700 having an inner cross-sectional dimension or diameter of about ¹³⁄₆₄", and a number of apertures 700 having an inner cross-sectional dimension or diameter of about ⁷⁄₃₂". In various embodiments, grinder plate 580 includes a number of apertures 700, most of which have an inner dimension or diameter greater than ³⁄₁₆".

In various other embodiments, the inner diameter or dimension of the smallest apertures 700 is greater than or equal to ³⁄₁₆". In various embodiments, the inner diameter or dimension of the smallest apertures 700 is greater than or equal to ¼". For example, and referring to FIGS. 11-12, in various embodiments, grinder plate 580 includes a number of apertures 700 having an inner cross-sectional dimension or diameter of about ⁹⁄₃₂", a number of apertures 700 having an inner cross-sectional dimension or diameter of about ¹⁹⁄₆₄", a number of apertures 700 having an inner cross-sectional dimension or diameter of about ⁵⁄₁₆", a number of apertures 700 having an inner cross-sectional dimension or diameter of about ²¹⁄₆₄", and a number of apertures 700 having an inner cross-sectional dimension or diameter of about ¹¹⁄₃₂". In various embodiments, grinder plate 580 includes a number of apertures 700, including fifteen to twenty-five percent having an inner cross-sectional dimension or diameter of about ⁹⁄₃₂", fifteen to twenty-five percent having an inner cross-sectional dimension or diameter of about ¹⁹⁄₆₄", fifteen to twenty-five percent having an inner cross-sectional dimension or diameter of about ⁵⁄₁₆", fifteen to twenty-five percent having an inner cross-sectional dimension or diameter of about ²¹⁄₆₄", and fifteen to twenty-five percent having an inner cross-sectional dimension or diameter of about ¹¹⁄₃₂". In various embodiments, grinder plate 580 includes a number of apertures 700, including eighteen to twenty-two percent having an inner cross-sectional dimension or diameter of about ⁹⁄₃₂", eighteen to twenty-two percent having an inner cross-sectional dimension or diameter of about ¹⁹⁄₆₄", eighteen to twenty-two percent having an inner cross-sectional dimension or diameter of about ⁵⁄₁₆", eighteen to twenty-two percent having an inner cross-sectional dimension or diameter of about ²¹⁄₆₄", and eighteen to twenty-two percent having an inner cross-sectional dimension or diameter of about ¹¹⁄₃₂".

It should be appreciated that the apertures may be of any size. For example, as illustrated, grinder plate 580 defines apertures or holes 700 having inner dimensions or diameters ranging from ³⁄₁₆"-½".

Referring to FIGS. 11-17, in various embodiments, apertures or holes 700 have a variety of shapes or cross-sectional shapes. In various embodiments, plate 580 defines holes or apertures 700 in at least two different types of cross-sectional shapes. For example, in various embodiments, grinder plate 580 includes or defines a variety of apertures 700, some having rounded cross-sectional shapes and some having pointed cross-sectional shapes. More specifically, in various embodiments, grinder plate 580 includes a variety of apertures 700, some having circular cross-sections and some having square cross sections. It should be appreciated, however, that the apertures may have other cross sectional shapes including oval, star, triangular, and/or rectangular shapes.

In various embodiments, grinder plate 580 includes a quantity of forty to sixty percent apertures 700 having pointed (e.g., square, rectangular, or triangular) shapes and a quantity of forty-five to fifty-five percent apertures 700 having rounded (e.g., circular or oval) shapes. In various embodiments, grinder plate 580 includes a quantity of forty-five to fifty-five percent apertures having pointed (e.g., square, rectangular, or triangular) shapes and a quantity of forty-five to fifty-five percent apertures 700 having rounded (e.g., circular or oval) shapes. In various embodiments, grinder plate 580 includes a quantity of about fifty percent apertures 700 having pointed (e.g., square, rectangular, or triangular) shapes and a quantity of about fifty percent apertures 700 having rounded (e.g., circular or oval) shapes.

In various embodiments, holes or apertures 700 are arranged to maximize or otherwise optimize the number or quantity of holes or apertures 700 in each plate 580, while maintaining sufficient or optimal plate robustness or durability.

In various embodiments, instead of using the disclosed grinder, and as illustrated in FIG. 19, a dicer 505 may replace the grinder in disclosed system 400. In various embodiments, meat may be pushed through a dicer 505 with one or more dicer blades (e.g., less than ½" apart) with one or more cutting blades 515 at dicer 505 exit to be further cut or ground into an irregular piece shape. In various examples of embodiments, dicer blade 515 spacing is ½"×¼" with ¼" spacer.

Figure 20:
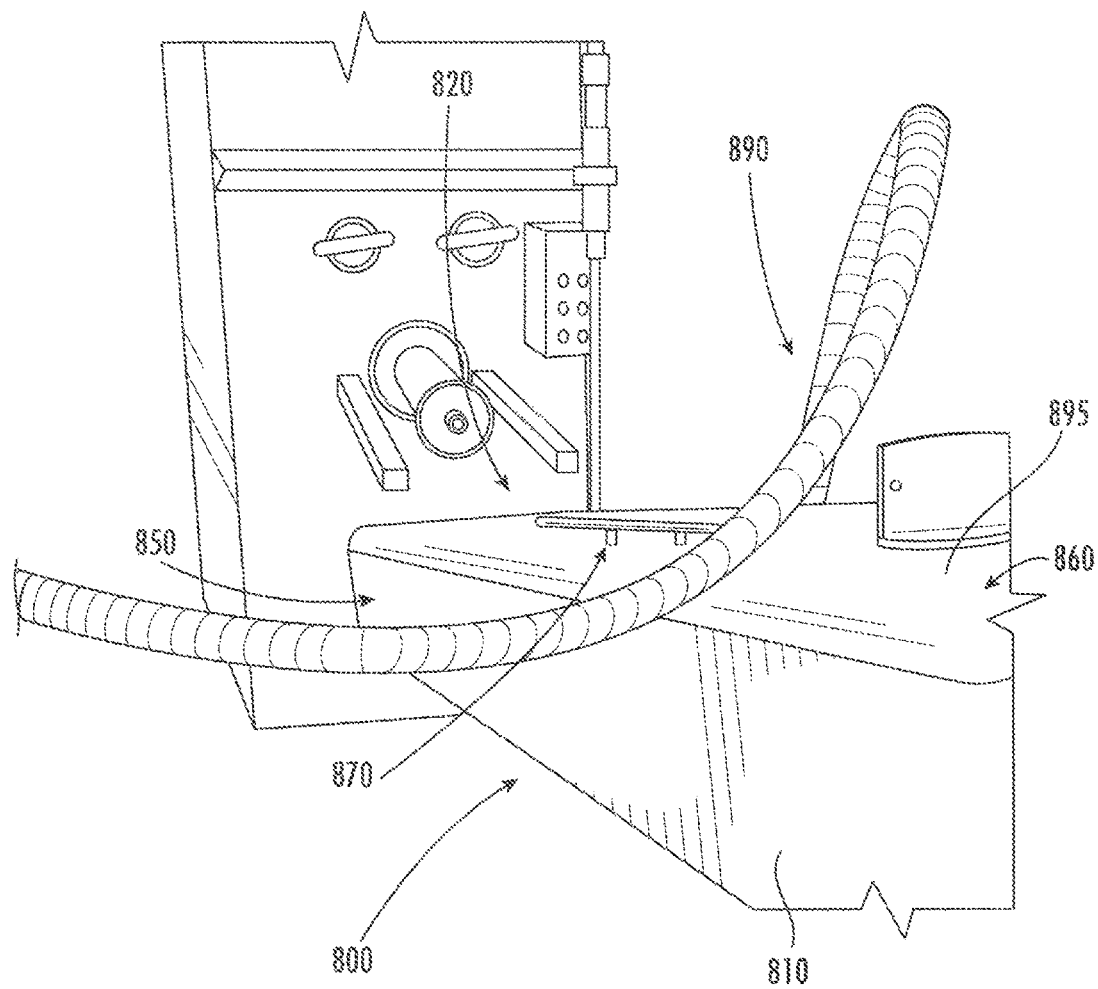
FIG. 20 illustrates a perspective view of a grinder and an auger or conveyor of a raw, frozen ground meat manufacturing system, according to various examples of embodiments.
Figure 21:
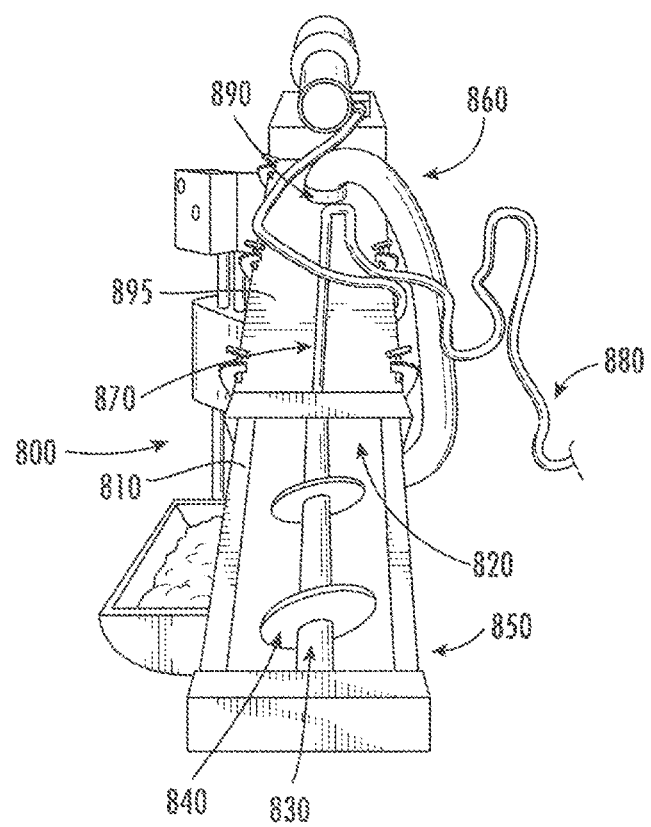
FIG. 21 illustrates a second perspective view of an auger or conveyor, according to various examples of embodiments.

Referring now to FIGS. 20-21, in various examples of embodiments, conveyor 800 is a screw or auger conveyor. In various embodiments, conveyor 800 includes a conveyor housing 810 having a central cavity 820. Within central cavity 820 of conveyor housing 810 is an auger 830 having a helical blade 840 which feeds ground meat from a proximal end 850 to a distal end 860 of conveyor housing 810. In various embodiments, conveyor 800 is inclined or positioned such that distal end 860 is relatively higher than or elevated relative to proximal end 850. In various embodiments, one or more cooling apertures 870 are defined in conveyor housing 810 and fluidly coupled to a source 880 of coolant, such as $CO_2$, $N_2$, argon, compressed air, freon, ammonia, or another known or later-developed coolant. In various embodiments, the coolant is $CO_2$. In various embodiments, housing 810 also defines one or more exhaust apertures 890 for exhausting off coolant and other gases from central cavity 820.

As illustrated in the Figures, one or more cooling apertures 870 and/or one or more exhaust apertures 890 are defined by a top or housing cover 895. It should be appreciated, however, that one or more cooling apertures and/or exhaust apertures may be defined in other portions or parts of the conveyor housing, including the floor or sides of the housing.

Figure 22:
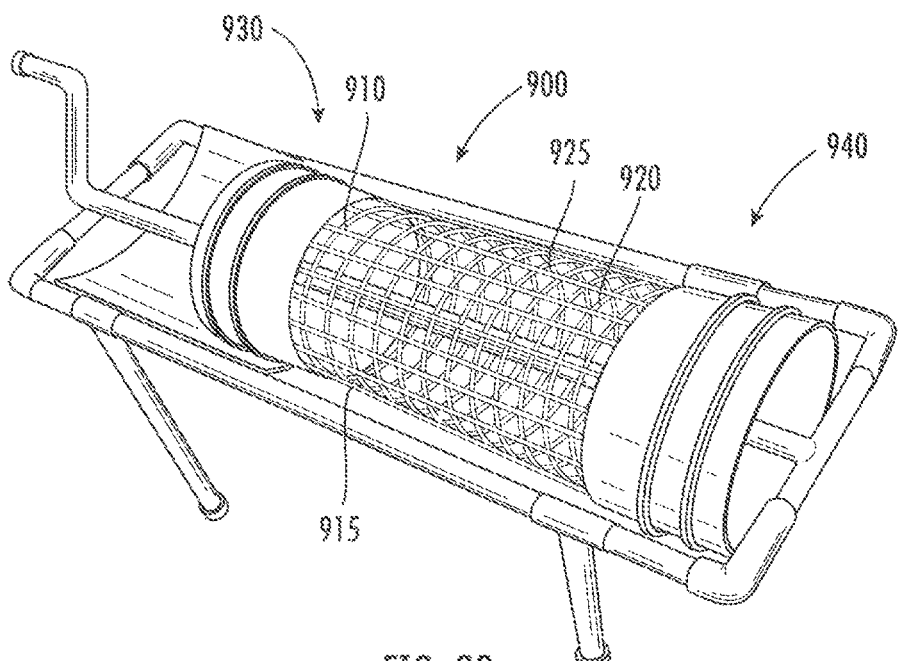
FIG. 22 illustrates a perspective view of a sifter, according to various examples of embodiments.

In various examples of embodiments, and referring now to FIG. 22, the system may also include a sifter 900. In various embodiments, sifter 900 is a horizontal rotary sifter. In various embodiments, sifter 900 includes a first wire cloth 910 relatively nearer a first end 930 of sifter 900, and a second wire cloth 920 relatively nearer a second end 940 of sifter 900. In various examples of embodiments, first wire cloth 910 defines multiple apertures 915 having a length and/or width of about $1/16"$-$3/16"$. In various examples of embodiments, first wire cloth 910 defines multiple apertures 915 having a length and/or width of about ⅛". In various examples of embodiments, second wire cloth 920 defines multiple apertures 925 having a length and/or width of about $3/16"$-⅝". In various examples of embodiments, second wire cloth 920 defines multiple apertures 925 having a length and/or width of about ¼".

Figure 23:
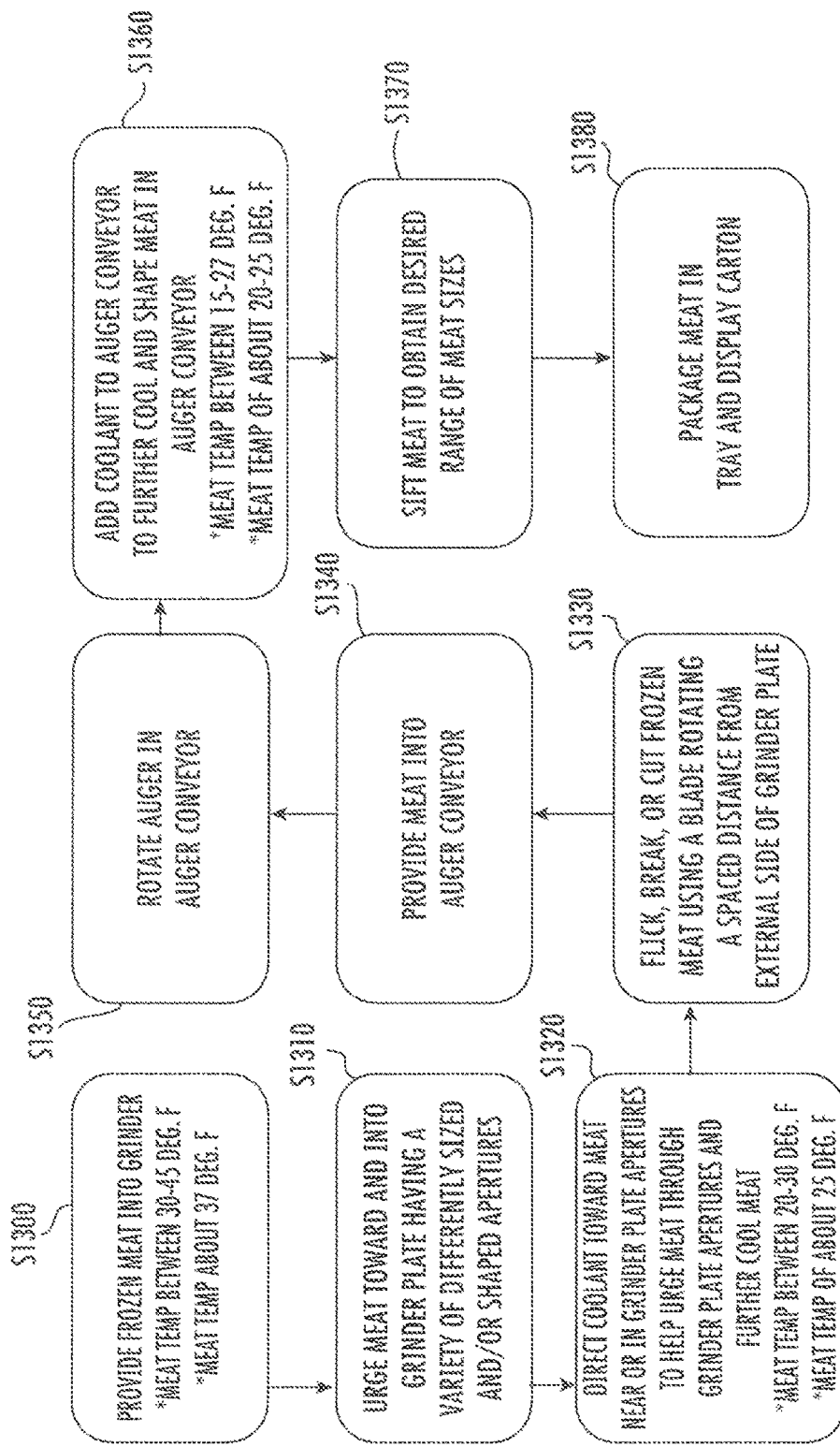
FIG. 23 illustrates a block diagram depicting a method of producing or processing a meat product, according to various examples of embodiments.

Referring now to FIG. 23, in operation in step S1300, meat (e.g., meat trimmings or pre-ground meat is provided into a grinder (e.g., grinder 500). In various embodiments, the meat is frozen, near frozen, or refrigerated when it is provided into the grinder. In various embodiments, meat goes into and through the grinder at a temperature of about 30 deg F. to about 45 deg F. For example, providing at least some frozen meat as a portion of the total in the grinder may help reduce the temperature in the grinder and may reduce the amount of coolant needed to be provided in the grinder. A more preferred temperature range is about 34 deg F. to about 40 deg F., with the most preferable temperature being about 37 deg F. In various embodiments, the meat provided into the grinder is generally free of undesirable components including tendons and tendinous material (e.g. shoulder tendons, elbow tendons, tendinous ends of shanks, Achilles tendons, and the like), back straps, heavy vein or artery pieces, and the like.

In various embodiments, meat is ground to desired sizes. In various embodiments, step S1310 a grinder auger auger 560) and an internal blade (e.g., blade 570) help press or otherwise urge the meat into and through a grinder plate (e.g., grinder plate 580). In various examples of embodiments, in step S1320 a coolant (e.g., $CO_2$) is also provided and directed and/or injected toward the grinder plate to help blow or otherwise force or urge the meat through and/or out of the grinder plate. In various embodiments, the coolant is injected before the grinder plate and directed toward the grinder plate at an angle to better or more optimally urge the meat through and out of the grinder plate. In various examples of embodiments, the meat is pressurized through the grinder plate at least in part by the injected coolant. In various embodiments, a sufficient or optimal amount of meat is provided in grinder to urge coolant flow through the grinder plate (rather than, for example, the top or another portion of the grinder) and/or achieve an optimal or desired crumbling effect. In various embodiments, the coolant also further lowers the temperature of the meat as it passes through the grinder plate and exits the grinder. In various embodiments, meat exits the grinder at a temperature of about 20 deg F. to about 30 deg F. A more preferred temperature range is about 23 deg F. to about 27 deg F., with the most preferable temperature being about 25 deg, F.

The coolant (e.g., $CO_2$) may be added in any suitable manner to achieve the objective of generating frozen ground meat pieces of a range of desired sizes. The purpose of the coolant is to establish a desired temperature of the meat and to help blow or otherwise urge the meat through the grinder plate. Amounts of coolant required depend on the initial temperature of the product, size of the batch, etc.

In various examples of embodiments, as the meat is provided past the outer surface of the grinder plate, or otherwise exits the grinder plate, in step S1330 the meat is acted upon by an external blade (e.g., external knife or blade 650). In various embodiments, the external knife or blade rotates at a spaced distance from the grinder plate and at a sufficient frequency and/or angle relative to the grinder plate so as to flick, break and/or cut the frozen meat just after it breaches the outer surface or otherwise exits the grinder plate. In various examples of embodiments, the external blade is rotated at a frequency of about one hundred revolutions per minute or more. In various examples of embodiments, the external blade is rotated at a frequency of at least one hundred and fifty revolutions per minute. In various examples of embodiments, the external blade is rotated at a frequency of about two hundred revolutions per minute.

In various embodiments, an additional cooling process is performed where at least one coolant (e.g., liquid $CO_2$, liquid $N_2$, argon, compressed air, freon, and/or the like) is utilized after the meat exits the grinder. More specifically, in various embodiments, and after being acted upon by the external blade or knife, in step S1340 the meat pieces are provided into a conveyor (e.g., conveyor 800). In various embodiments, in step S1350 a conveyor auger (e.g., auger 830) is rotated to feed the ground meat up an incline from the conveyor housing's lower proximal end to its upper distal end. As the meat is fed by the auger, in step S1360 coolant (e.g., $CO_2$) is provided, added or injected into one or more portions of the conveyor housing.

In various embodiments, while in the conveyor, further shaping of the meat pieces, fragments or morsels is undertaken by means of the conveyor auger in the substantially closed conveyor or its central cavity. In various embodiments, the conveyor auger and action caused by the auger helps to further break up the meat product, retain piece separation, and/or create a unique shape and more optimal or natural appearance. For example, in various embodiments, the action of the conveyor auger or screw tumbles the meat pieces over and around one another and helps soften any edges on the pieces, helps break up any clumps, and/or helps improve or optimize meat piece size variability. This is an improvement over known conveying systems that blow small product around, and/or allow small pieces to fall through belts. In addition, the process further breaks up pieces and edges to create more natural-looking or appealing meat pieces.

The coolant can be incorporated at various temperatures and in various quantities depending on the type of meat being processed and the desired final product. The coolant (e.g., $CO_2$) can be added in any suitable manner to achieve the objective of generating frozen ground meat product pieces of a range of desired sizes. The purpose of the coolant in the additional freeze process is to establish a desired temperature of the meat in and/or as it exits the conveyor. Amounts of coolant required depend on the initial temperature of the product and/or the size of the batch, etc.

In addition, the coolant further cools the meat pieces to help retain separation of individual meat pieces. In various embodiments, meat is further cooled in the conveyor to a temperature of about 20 deg F. to about 25 deg F. In various embodiments, meat is further cooled in the conveyor to a temperature of about 15 deg F. to about 27 deg F. A more preferred temperature range is about 22 deg F. to about 27 deg F., with the more preferable temperature being about 25 deg F.

In various other embodiments, meat is further cooled in the conveyor to a temperature of about 15 deg F. to about 25 deg F. A more preferred temperature range is about 18 deg F. to about 22 deg F., with the more preferable temperature being about 20 deg F.

In various embodiments, in step 1370 the meat is sifted (e.g., using a sifter such as sifter 900) after exiting the conveyor to further obtain a desired range or ranges of meat piece sizes or diameters. For example, the ground meat pieces may be provided into a rotary horizontal sifter. In various embodiments, the sifter is rotated such that the meat pieces therein are tumbled from a first end of the sifter towards a second end of the sifter. As the meat pieces are tumbled within a first wire cloth (e.g., first wire cloth 910), a first group size or range of sizes of pieces (e.g., fines or pieces of less than desirable or optimal sizes) fall through apertures defined in the first wire cloth. Pieces in the first group of pieces may then be reworked. As the remaining meat pieces reach and are tumbled within a second wire cloth (e.g., second wire cloth 920), a second group of pieces (e.g., pieces of desirable or optimal sizes) fall through apertures defined in the second wire cloth. Pieces in the second group of pieces may then be conveyed to packaging. Any meat pieces that do not fall out through either the first wire cloth or second wire cloth (e.g., pieces of greater than desirable or optimal sizes) can also reworked.

It should be appreciated that other types of sifters may be utilized. For example, a vibratory sifter may also be used to help separate more optimum meat pieces that may be packaged and sold from less optimum pieces that should be reworked.

After the meat exits the conveyor or the sifter, inclusions may be added in a dried, wet, and/or frozen state, (preferably frozen) for instance, peppers, onions, salt or any other dried inclusion. The inclusions may also be added before the meat is provided into the conveyor, or before the meat is provided in the grinder. Another way to add inclusions is by spraying the meat according to known methods with a desired inclusion spray (e.g., sauces, gravies, antioxidants and the like.)

In various embodiments, in step S1380, the desired meat is packaged in a packaging system (e.g., packaging system 250) tray (e.g., tray 200) and a carton (e.g., carton 300). Preferably, all $CO_2$ is completely sublimated or dissipated before packaging. In various embodiments, the sifting process helps dissipate $CO_2$ before packaging.

In various embodiments, packaging or final packaging of meat or raw meat is accomplished by filling packaging equipment such as either tray seal, form fill and seal, or pouch packaging equipment. In various embodiments, each individual package unit is sealed under controlled atmosphere in package conditions with a nitrogen, $O_2$, CO, and/or $CO_2$ gas mixture to preserve color and freshness. In various examples of embodiments, packaging material used includes a multi-layer structure with oxygen barrier qualities to help assure that final packages include residual oxygen levels in the range of 0.05-2.0% to stabilize color, prevent oxidative rancidity though product shelf-life, and/or provide an appearance typical of uncooked product.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

We claim:

1. A method for processing meat, the method comprising:
   providing meat into a meat grinder having a grinder plate having a first surface and a second surface and defining apertures of different sizes and shapes extending between the first surface and the second surface;
   providing an inlet fluidly coupled to a source of coolant;
   providing an injection valve in communication with said inlet;
   providing a first auger within the meat grinder to move the meat toward the grinder plate;
   urging the meat into one or more of the apertures of the grinder plate;
   directing a first coolant through said inlet pressurized by said injection valve within a central cavity of the meat grinder and in a gap located between a forward end of said first auger and said first surface of said grinder plate; and
   wherein the meat is forced through the apertures in order to further cool the meat near and in the apertures.

2. The method of claim 1, wherein the first coolant is carbon dioxide.

3. The method of claim 1, wherein the meat provided in the meat grinder is at a temperature ranging from 34-40 deg F.

4. The method of claim 3, wherein the meat provided in the meat grinder is at a temperature of about 38 deg F.

5. The method of claim 1, wherein the meat in and/or near the grinder plate apertures is further cooled to a temperature ranging from 23-27 deg F.

6. The method of claim 5, wherein the meat in and/or near the grinder plate apertures is further cooled to a temperature of about 25 deg F.

7. The method of claim 1, further comprising:
   rotating an internal blade near the first surface of the grinder plate to help urge the meat into and/or through the one or more grinder plate apertures.

8. The method of claim 1, further comprising:
   rotating an external blade spaced from the second surface of the grinder plate to help break or cut the meat into meat pieces as the meat is urged out of the one or more grinder plate apertures and beyond the second surface.

9. The method of claim 8, further comprising:
   providing the meat pieces into a conveyor comprising a housing defining at least one inlet for a second coolant and a second auger;
   rotating the second auger to help convey the meat pieces from a proximal end of the housing toward a distal end of the housing;
   providing the second coolant through the at least one inlet to further cool the meat pieces.

10. The method of claim 9, wherein rotating the second auger also helps to further shape or form the meat pieces.

11. The method of claim 9, wherein the second coolant is carbon dioxide.

12. The method of claim 9, wherein the meat pieces are further cooled in the conveyor to a temperature up to 27 deg F.

13. The method of claim 11, wherein the meat pieces are further cooled in the conveyor to a temperature of 20-25 deg F.

14. The method of claim 9, further comprising sifting the meat pieces to help separate pieces of desired sizes and/or a range of sizes from meat pieces of less or greater than desired sizes and/or range of sizes.

* * * * *